United States Patent
Kwon et al.

(10) Patent No.: US 12,146,020 B2
(45) Date of Patent: Nov. 19, 2024

(54) HYBRID SUPPORTED METALLOCENE CATALYST AND PROCESS FOR PREPARING POLYETHYLENE COPOLYMER USING THE SAME

(71) Applicant: LG Chem, Ltd., Seoul (KR)

(72) Inventors: Hyun Jee Kwon, Daejeon (KR); Seungmi Lee, Daejeon (KR); Jung Won Lee, Daejeon (KR); Poeun Kim, Daejeon (KR); Yongwoo Kwon, Daejeon (KR); Ki Soo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 610 days.

(21) Appl. No.: 17/601,281

(22) PCT Filed: Sep. 29, 2020

(86) PCT No.: PCT/KR2020/013426
§ 371 (c)(1),
(2) Date: Oct. 4, 2021

(87) PCT Pub. No.: WO2021/066579
PCT Pub. Date: Apr. 8, 2021

(65) Prior Publication Data
US 2022/0162353 A1    May 26, 2022

(30) Foreign Application Priority Data

Sep. 30, 2019 (KR) .................. 10-2019-0120944
Sep. 28, 2020 (KR) .................. 10-2020-0126247

(51) Int. Cl.
C08F 4/6592 (2006.01)
C08F 210/02 (2006.01)

(52) U.S. Cl.
CPC .......... *C08F 4/6592* (2013.01); *C08F 210/02* (2013.01)

(58) Field of Classification Search
None
See application file for complete search history.

(56) References Cited

U.S. PATENT DOCUMENTS

| | | |
|---|---|---|
| 6,479,646 B1 | 11/2002 | Nakano et al. |
| 2006/0183874 A1 | 8/2006 | Voskoboynikov et al. |
| 2008/0287617 A1 | 11/2008 | Holtcamp |
| 2012/0015123 A1 | 1/2012 | Kwon et al. |
| 2012/0041149 A1 | 2/2012 | Shin et al. |
| 2013/0225834 A1 | 8/2013 | Shin et al. |
| 2015/0232589 A1 | 8/2015 | Best et al. |
| 2018/0079841 A1 | 3/2018 | Cho et al. |
| 2018/0208693 A1 | 7/2018 | Sung et al. |
| 2020/0010589 A1 | 1/2020 | Lee et al. |
| 2020/0123290 A1 | 4/2020 | Park et al. |
| 2021/0032449 A1 | 2/2021 | Park et al. |

FOREIGN PATENT DOCUMENTS

| | | |
|---|---|---|
| CN | 101679541 A | 3/2010 |
| CN | 102083870 A | 6/2011 |
| CN | 103003318 A | 3/2013 |
| CN | 106661159 A | 5/2017 |
| CN | 107406538 A | 11/2017 |
| CN | 108884184 A | 11/2018 |
| CN | 109071701 A | 12/2018 |
| EP | 3421507 A1 | 1/2019 |

(Continued)

OTHER PUBLICATIONS

International Search Report for Application No. PCT/KR2020/013426, dated Jan. 20, 2021, 3 pages.

(Continued)

*Primary Examiner* — Catherine S Branch
(74) *Attorney, Agent, or Firm* — Lerner David LLP

(57) ABSTRACT

The present disclosure provides a hybrid supported metallocene catalyst useful for preparing a polyethylene copolymer capable of producing an mLLDPE shrink film having excellent shrinkage and processability with excellent mechanical properties, and a process for preparing a polyethylene copolymer using the same. The hybrid supported metallocene catalyst comprises at least one first metallocene compound selected from compounds represented by the following Chemical Formula 1 and at least one second metallocene compound selected from compounds represented by the following Chemical Formula 2:

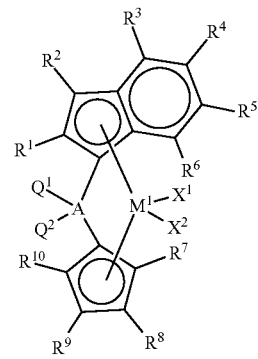

[Chemical Formula 1]

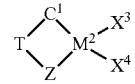

[Chemical Formula 2]

wherein the variables are described herein.

18 Claims, No Drawings

(56) References Cited

FOREIGN PATENT DOCUMENTS

| KR | 101212637 B1 | 12/2012 |
|----|----|----|
| KR | 20130051467 A | 5/2013 |
| KR | 101288500 B1 | 7/2013 |
| KR | 101309389 B1 | 9/2013 |
| KR | 20150038416 A | 4/2015 |
| KR | 20160084181 A | 7/2016 |
| KR | 20170106110 A | 9/2017 |
| KR | 20180063669 A | 6/2018 |
| KR | 20180087868 A | 8/2018 |
| KR | 20190074963 A | 6/2019 |
| KR | 20190079381 A | 7/2019 |
| WO | 2006065844 A2 | 6/2006 |
| WO | 2018105852 A1 | 6/2018 |

OTHER PUBLICATIONS

Extended European Search Report including Written Opinion for Application No. 20871549.0 dated Jun. 27, 2022, pp. 1-10.
Search Report dated Sep. 23, 2022 from the Office Action for Chinese Application No. 202080025132.3 issued Oct. 8, 2022, pp. 1-3.

HYBRID SUPPORTED METALLOCENE CATALYST AND PROCESS FOR PREPARING POLYETHYLENE COPOLYMER USING THE SAME

CROSS-REFERENCE TO RELATED APPLICATION(S)

The present application is a national stage entry under 35 U.S.C. § 371 of International Application No. PCT/KR2020/013426 filed on Sep. 29, 2020, which claims priority from Korean Patent Application No. 10-2019-0120944 filed on Sep. 30, 2019, and Korean Patent Application No. 10-2020-0126247 filed on Sep. 28, 2020, all the disclosures of which are incorporated herein by reference.

TECHNICAL FIELD

The present disclosure relates to a hybrid supported metallocene catalyst, and a process for preparing a polyethylene copolymer using the same.

BACKGROUND

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

Recently, due to changes in environmental awareness, it has been attempted to reduce the generation of volatile organic compounds (VOCs) in many products. However, the Ziegler-Natta catalyst (Z/N), which is mainly used in the preparation of polyethylene, has a problem of generating many VOCs. In particular, various commercially available polyethylene products are mainly prepared using the Ziegler-Natta catalyst, but recently, a conversion to products prepared using the metallocene catalyst having low odor and low elution characteristics has been accelerated.

Meanwhile, low density polyethylene (LDPE) is produced by copolymerizing ethylene and alpha-olefin using a polymerization catalyst, and is increasingly used in shrink films. The shrink film has been used for years in the packaging industry to wrap products. The process includes packing the product and heating in an oven, whereby the film is retracted so as to render the packing tight and suitable to its end use.

It is well known to use the linear low density polyethylene (LLDPE) in blend with low density polyethylene (LDPE) in shrink film compositions. Compositions containing 20 to 40 wt % of LLDPE with 80 to 60 wt % of LDPE are commonly used. Indeed, the addition of LLDPE to LDPE in shrink film compositions is well known in order to avoid the formation of holes that could occur during the retraction of shrink film made from pure LDPE.

Nevertheless, the currently available polyethylene resins suffer from major drawbacks. The low density polyethylene (LDPE) resins exhibit excellent optical properties and processability, but they have poor mechanical properties and poor rigidity.

In order to supplement these characteristics, shrink films are produced by mixing with linear low density polyethylene (LLDPE) or high density polyethylene (HDPE). However, when LLDPE or HDPE is mixed with LDPE to improve mechanical properties, there is a problem in that shrinkage properties are reduced.

Linear low density polyethylene (LLDPE) resins generally have excellent mechanical properties, but have mediocre optical properties and poor processability. Indeed, LLDPE leads to bubble instability and its extrusion is difficult. If mixed with LDPE, they have improved processability, but their mechanical properties are reduced.

In addition, metallocene-catalyzed linear low density polyethylene (mLLDPE) resins have excellent mechanical properties, but their poor optical properties and processability require extrusion equipment specially designed for mLLDPE with a wide die gap. If mixed with LDPE, they have excellent optical properties and good sealing properties, but the mechanical properties are reduced.

Wherever high rigidity is needed, LDPE and LLDPE compositions require overly thick structures. Especially for LLDPE, where excellent impact and tear properties render its down-gauging capability useful, the lack of rigidity is a main drawback, because high rigidity is a requirement for product packaging.

Accordingly, there is a need for a catalyst for preparing low density polyethylene capable of producing a low density polyethylene resin for preparing a shrink film having excellent mechanical properties while maintaining high shrinkage properties in the heat shrink process.

DETAILED DESCRIPTION OF THE INVENTION

Technical Problem

In the present disclosure, there is provided a hybrid supported metallocene catalyst useful for preparing a polyethylene copolymer capable of producing an mLLDPE shrink film having excellent shrinkage and processability with excellent mechanical properties.

In addition, there is provided a process for preparing a polyethylene copolymer using the hybrid supported metallocene catalyst.

Technical Solution

In the present disclosure, there is provided a hybrid supported metallocene catalyst including at least one first metallocene compound selected from compounds represented by the following Chemical Formula 1; at least one second metallocene compound selected from compounds represented by the following Chemical Formula 2; and a support on which the first and the second metallocene compounds are supported:

[Chemical Formula 1]

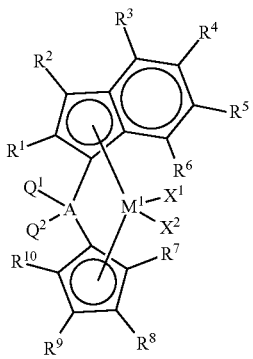

in Chemical Formula 1, $M^1$ is a Group 4 transition metal;

A is carbon (C), silicon (Si), or germanium (Ge);

$X^1$ and $X^2$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, or a C1 to C30 sulfone group;

$R^1$ and $R^3$ to $R^{10}$ are the same as or different from each other, and are each independently hydrogen, a C1 to C30 hydrocarbyl group, a C1 to C30 hydrocarbyloxy group, or a C2 to C30 hydrocarbyloxyhydrocarbyl group;

$R^2$ is hydrogen, a C1 to C30 hydrocarbyl group, a C1 to C30 hydrocarbyloxy group, a C2 to C30 hydrocarbyloxyhydrocarbyl group, a C1 to C20 hydrocarbyl(oxy)silyl group, or a C1 to C20 silylhydrocarbyl group; and $Q^1$ and $Q^2$ are the same as or different from each other, and are each independently a C1 to C30 hydrocarbyl group, or a C1 to C30 hydrocarbyloxy group;

[Chemical Formula 2]

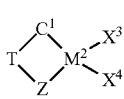

in Chemical Formula 2, $M^2$ is a Group 4 transition metal;

$X^3$ and $X^4$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, or a C1 to C30 sulfone group;

Z is —O—, —S—, —NR$_a$—, or —PR$_a$—;

$R_a$ is any one of hydrogen, a C1 to C20 hydrocarbyl group, a C1 to C20 hydrocarbyl(oxy)silyl group, or a C1 to C20 silylhydrocarbyl group;

T is

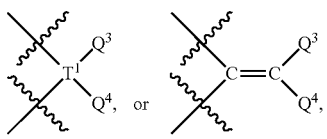

$T^1$ is C, Si, Ge, Sn, or Pb;

$Q^3$ is any one of hydrogen, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 hydrocarbyl group substituted with halogen, or —NR$_b$R$_c$;

$Q^4$ is any one of a C2 to C30 hydrocarbyloxyhydrocarbyl group;

$R_b$ and $R_c$ are each independently any one of hydrogen, or a C1 to C30 hydrocarbyl group, or $R_b$ and $R_e$ may be connected with each other to form an aliphatic or aromatic ring; and $C^1$ is any one of ligands represented by the following Chemical Formulae 2a to 2d,

[Chemical Formula 2a]

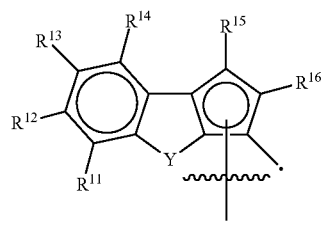

[Chemical Formula 2b]

[Chemical Formula 2c]

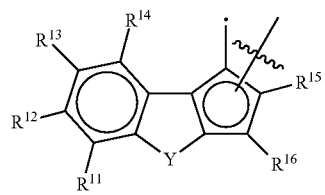

[Chemical Formula 2d]

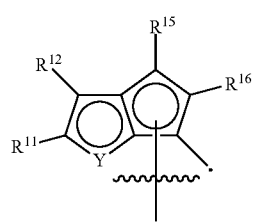

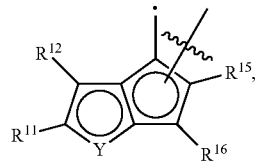

in Chemical Formulae 2a to 2d

Y is O, or S, $R^{11}$ to $R^{16}$ are the same as or different from each other, and are each independently any one of hydrogen, a C1 to C30 hydrocarbyl group, or a C1 to C30 hydrocarbyloxy group, —— represents a site of binding to T, and ⇌ represents a site of binding to $M^2$.

In the present disclosure, there is also privded a process for preparing a polyethylene copolymer, including the step of copolymerizing ethylene and alpha-olefin in the presence of the above-described hybrid supported metallocene catalyst.

In the present disclosure, there is also privded a polyethylene copolymer obtained by the above-described process.

The terminology used herein is for the purpose of describing particular embodiments only and is not intended to be limiting of the invention.

The singular forms are intended to include the plural forms as well, unless the context clearly indicates otherwise.

In the present disclosure, the terms "include", "comprise", or "have" specify the presence of stated features, numbers, steps, components, or combinations thereof, but do not preclude the presence or addition of one or more other features, numbers, steps, components, or combinations thereof.

Also, as used herein, when a layer or an element is mentioned to be formed "on" layers or elements, the layer or element may be directly formed on the layers or elements, or other layers or elements may be additionally formed between the layers, on a subject, or on a substrate.

In the present disclosure, ┼ or ─── means a bond connected to another substituent.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to an embodiment of the present disclosure, there is provided a hybrid supported metallocene catalyst including at least one first metallocene compound selected from compounds represented by the following Chemical Formula 1; at least one second metallocene compound selected from compounds represented by the following Chemical Formula 2; and a support on which the first and the second metallocene compounds are supported:

[Chemical Formula 1]

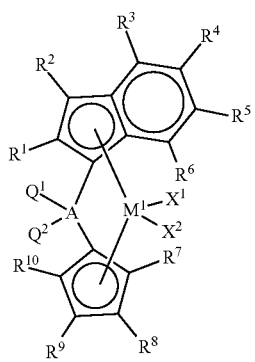

in Chemical Formula 1,
$M^1$ is a Group 4 transition metal;
A is carbon (C), silicon (Si), or germanium (Ge);
$X^1$ and $X^2$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, or a C1 to C30 sulfone group;

$R^1$ and $R^3$ to $R^{10}$ are the same as or different from each other, and are each independently hydrogen, a C1 to C30 hydrocarbyl group, a C1 to C30 hydrocarbyloxy group, or a C2 to C30 hydrocarbyloxyhydrocarbyl group;

$R^2$ is hydrogen, a C1 to C30 hydrocarbyl group, a C1 to C30 hydrocarbyloxy group, a C2 to C30 hydrocarbyloxyhydrocarbyl group, a C1 to C20 hydrocarbyl(oxy)silyl group, or a C1 to C20 silylhydrocarbyl group; and $Q^1$ and $Q^2$ are the same as or different from each other, and are each independently a C1 to C30 hydrocarbyl group, or a C1 to C30 hydrocarbyloxy group;

[Chemical Formula 2]

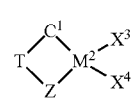

in Chemical Formula 2,
$M^2$ is a Group 4 transition metal;
$X^3$ and $X^4$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 sulfonate group, or a C1 to C30 sulfone group;

Z is —O—, —S—, —NR$_a$—, or —PR$_a$—; R$_a$ is any one of hydrogen, a C1 to C20 hydrocarbyl group, a C1 to C20 hydrocarbyl(oxy)silyl group, or a C1 to C20 silylhydrocarbyl group;

T is

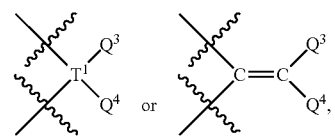

$T^1$ is C, Si, Ge, Sn, or Pb;
$Q^3$ is any one of hydrogen, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl(oxy)silyl group, a C1 to C30 hydrocarbyl group substituted with halogen, or —NR$_b$R$_c$;

$Q^4$ is any one of a C2 to C30 hydrocarbyloxyhydrocarbyl group;

R$_b$ and R$_c$ are each independently any one of hydrogen, or a C1 to C30 hydrocarbyl group, or R$_b$ and R$_c$ may be connected with each other to form an aliphatic or aromatic ring; and $C^1$ is any one of ligands represented by the following Chemical Formulae 2a to 2d,

[Chemical Formula 2a]

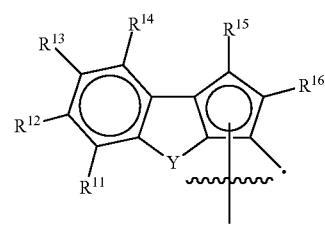

-continued

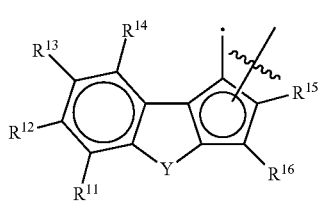

[Chemical Formula 2b]

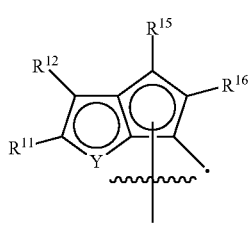

[Chemical Formula 2c]

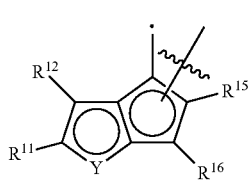

[Chemical Formula 2d]

in Chemical Formulae 2a to 2d,

Y is O, or S, $R^{11}$ to $R^{16}$ are the same as or different from each other, and are each independently any one of hydrogen, a C1 to C30 hydrocarbyl group, or a C1 to C30 hydrocarbyloxy group, —— represents a site of binding to T, and ⊹ represents a site of binding to $M^2$.

Unless otherwise specified herein, following terms may be defined as follows.

The hydrocarbyl group is a monovalent functional group in a hydrogen-removed form from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. The C1 to C30 hydrocarbyl group may be a C1 to C20 or C1 to C10 hydrocarbyl group. For example, the hydrocarbyl group may be a linear, branched or cyclic alkyl. More specifically, the C1 to C30 hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

The hydrocarbyloxy group is a functional group in which the hydrocarbyl group is bonded to oxygen. Specifically, the C1 to C30 hydrocarbyloxy group may be a C1 to C20 or C1 to C10 hydrocarbyloxy group. For example, the hydrocarbyloxy group may be a linear, branched or cyclic alkoxy. More specifically, the C1 to C30 hydrocarbyloxy group may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexyloxy group, an n-heptoxy group and a cyclohexyloxy group; or an aryloxy group such as a phenoxy group and a naphthalenoxy group.

The hydrocarbyloxyhydrocarbyl group is a functional group in which at least one hydrogen of the hydrocarbyl group is substituted with at least one hydrocarbyloxy group. Specifically, the C2 to C30 hydrocarbyloxyhydrocarbyl group may be a C2 to C20 or C2 to C15 hydrocarbyloxyhydrocarbyl group. For example, the hydrocarbyloxyhydrocarbyl group may be a linear, branched or cyclic alkoxyalkyl. More specifically, the C2 to C30 hydrocarbyloxyhydrocarbyl group may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group and a tert-butoxyhexyl group; or an aryloxyalkyl group such as a phenoxyhexyl group.

The hydrocarbyl(oxy)silyl group is a functional group in which one to three hydrogens of —$SiH_3$ are substituted with one to three hydrocarbyl or hydrocarbyloxy groups. Specifically, the C1 to C30 hydrocarbyl(oxy)silyl group may be a C1 to C20, C1 to C15, C1 to C10, or C1 to C5 hydrocarbyl (oxy)silyl group. More specifically, the C1 to C30 hydrocarbyl(oxy)silyl group may be an alkylsilyl group such as a methylsilyl group, a dimethylsilyl group, a trimethylsilyl group, a dimethylethylsilyl group, a diethylmethylsilyl group, or a dimethylpropylsilyl group; an alkoxysilyl group such as a methoxysilyl group, a dimethoxysilyl group, a trimethoxysilyl group, or a dimethoxyethoxysilyl group; or an alkoxyalkylsilyl group such as a methoxydimethylsilyl group, a diethoxymethylsilyl group, or a dimethoxypropylsilyl group.

The C1 to C20 silylhydrocarbyl group is a functional group in which at least one hydrogen of the hydrocarbyl group is substituted with a silyl group. The silyl group may be —$SiH_3$ or a hydrocarbyl(oxy)silyl group. Specifically, the C1 to C20 silylhydrocarbyl group may be a C1 to C15 or C1 to C10 silylhydrocarbyl group. More specifically, C1 to C20 silylhydrocarbyl group may be a silylalkyl group such as —$CH_2$—$SiH_3$; an alkylsilylalkyl group such as a methylsilylmethyl group, a methylsilylethyl group, a dimethylsilylmethyl group, a trimethylsilylmethyl group, a dimethylethylsilylmethyl group, a diethylmethylsilylmethyl group, or a dimethylpropylsilylmethyl group; or an alkoxysilylalkyl group such as a dimethylethoxysilylpropyl group.

The halogen may be fluorine (F), chlorine (Cl), bromine (Br) or iodine (I).

The sulfonate group has a structure of —O—$SO_2$—$R^a$, and $R^a$ may be a C1 to C30 hydrocarbyl group. Specifically, the C1 to C30 sulfonate group may be a methanesulfonate group, a phenylsulfonate group, or the like.

The C1 to C30 sulfone group has a structure of —$R^{c'}$-$SO_2$—$R^{c''}$, and $R^{c'}$ and $R^{c''}$ may be the same as or different from each other, and may each independently be any one of a C1 to C30 hydrocarbyl group. Specifically, the C1 to C30 sulfone group may be a methylsulfonylmethyl group, a methylsulfonylpropyl group, a methylsulfonylbutyl group, a phenylsulfonylpropyl group, or the like.

In this disclosure, "two neighboring substituents are connected with each other to form an aliphatic or aromatic ring" means that the atom(s) of two substituents and the atom(s) to which the two substituents are bonded are connected with each other to form a ring. Specifically, examples in which $R_a$ and $R_b$ or $R_{a'}$ and $R_{b'}$ of —$NR_aR_b$ or —$NR_{a'}R_{b'}$ are connected with each other to form an aliphatic ring include a piperidinyl group, and examples in which $R_a$ and $R_b$ or $R_{a'}$ and $R_{b'}$ of —$NR_aR_b$ or —$NR_aR_{b'}$ are connected with each other to form an aromatic ring include a pyrrolyl group.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The above-mentioned substituents may optionally be substituted with one or more substituents selected from the group consisting of a hydroxyl group; halogen; a hydrocarbyl group; a hydrocarbyloxy group; a hydrocarbyl group or a hydrocarbyloxy group containing at least one heteroatom of Group 14 to 16 heteroatoms; a silyl group; a hydrocarbyl (oxy)silyl group; a phosphine group; a phosphide group; a sulfonate group; and a sulfone group within the range of exhibiting the same or similar effect as the desired effect.

Meanwhile, the hybrid supported metallocene catalyst of the present disclosure is prepared by hybrid supporting a first metallocene compound capable of increasing the LCB (long chain branch) content and a second metallocene compound capable of increasing the SCB (short chain branch) content during ethylene polymerization, thereby exhibiting excellent process stability and high activity for ethylene polymerization. In addition, it is useful for preparing a polyethylene copolymer having excellent shrinkage and processability with excellent mechanical properties by improving the molecular structure and changing the distribution.

Particularly, in the hybrid supported metallocene catalyst according to the embodiment, the first metallocene compound represented by the Chemical Formula 1 contributes to improving mechanical properties by increasing the long chain branch (LCB) content to improve the molecular structure and change the distribution, and the second metallocene compound represented by the Chemical Formula 2 contributes to improving shrinkage and processability by increasing the short chain branch (SCB) content. The hybrid supported metallocene catalyst may exhibit excellent supporting performance, catalytic activity, and high comonomer incorporation by using the first metallocene compound having low comonomer incorporation and the second metallocene compound having high comonomer incorporation as the hybrid catalyst. Particularly, when low density polyethylene is produced in a slurry process in the presence of the hybrid supported metallocene catalyst, stability is improved in the process, and thus fouling problems that have occurred in the prior art can be prevented.

Specifically, the first metallocene compound may be represented by the following Chemical Formula 1-1.

[Chemical Formula 1-1]

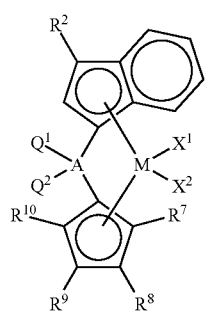

in Chemical Formula 1-1, $M^1$, $X^1$, $X^2$, $R^2$, $R^7$ to $R^{10}$, A, $Q^1$, and $Q^2$ are the same as defined in Chemical Formula 1.

In Chemical Formula 1, $M^1$ may be titanium (Ti), zirconium (Zr) or hafnium (Hf), and preferably be zirconium (Zr).

In addition, A may be silicon (Si).

And, in Chemical Formula 1, each of $X^1$ and $X^2$ may be halogen, and specifically be chlorine.

In Chemical Formula 1, each of $R^1$ and $R^3$ to $R^6$ may be hydrogen, and $R^2$ may be hydrogen, a C1 to C10 alkyl group, a C1 to C10 alkoxy group, a C2 to C10 alkenyl group, a C6 to C12 aryl group, a C7 to C14 arylalkyl group, a C7 to C14 alkylaryl group, a C1 to C10 alkylsilyl group, a C1 to C10 silylalkyl group, or a C2 to C12 alkylsilylalkylene group. Specifically, each of $R^1$ and $R^3$ to $R^6$ may be hydrogen, and $R^2$ may be hydrogen, methyl, ethyl, propyl, butyl, butenyl, trimethylsilylmethyl, or phenyl.

In Chemical Formula 1, each of $R^7$ to $R^{10}$ may be a C1 to C20 alkyl group, specifically be a C1 to C3 alkyl group, and more specifically be methyl.

In Chemical Formula 1, each of $Q^1$ and $Q^2$ may be a C1 to C20 alkyl group, or a C6 to C12 aryl group, and specifically be a C1 to C6 alkyl group, or a C6 to C12 aryl group. More specifically, it may be methyl, ethyl, or phenyl.

In addition, the first metallocene compound may be represented by one of the following structural formulae.

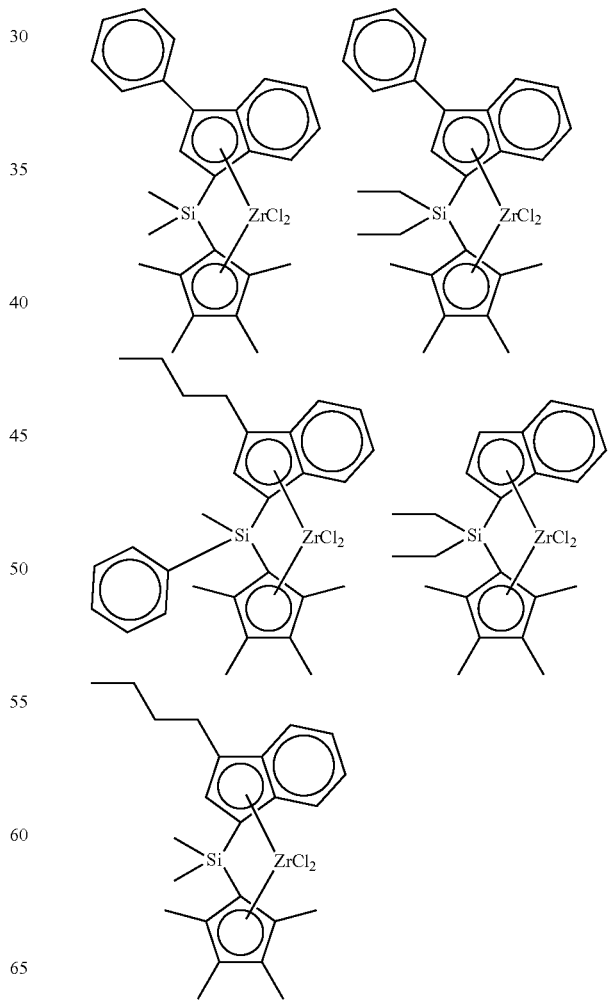

-continued

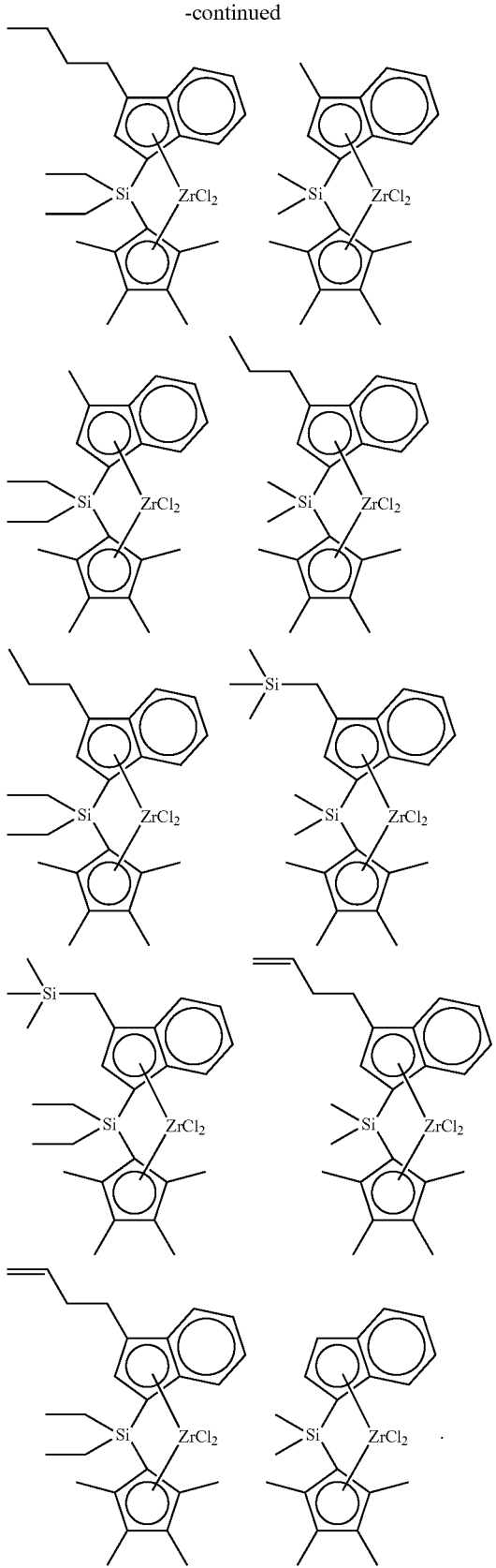

The first metallocene compound represented by the above structural formulae may be synthesized by applying known reactions, and a more detailed synthesis method may be understood with reference to Examples.

Meanwhile, in the process for preparing the metallocene compound, the hybrid supported catalyst, or the catalyst composition of the present disclosure, the equivalent weight (eq) refers to a molar equivalent weight (eq/mol).

In the present disclosure, the first metallocene compound may be a meso isomer, a racemic isomer, or a mixture thereof.

In the present disclosure, "racemic form", "racemate" or "racemic isomer" refers to a form in which the same substituents on two cyclopentadienyl moieties are on opposite sides with respect to a plane containing a transition metal represented by M1 or M2 in Chemical Formula 1 or 2 such as zirconium (Zr) or hafnium (Hf), and a center of the cyclopentadienyl moieties.

In addition, "meso form" or "meso isomer" refers to a stereoisomer of the above-mentioned racemic isomer, wherein the same substituents on two cyclopentadienyl moieties are on the same side with respect to a plane containing a transition metal represented by $M_1$ or $M_2$ in Chemical Formula 1 or 2 such as zirconium (Zr) or hafnium (Hf), and a center of the cyclopentadienyl moieties.

Meanwhile, the hybrid supported metallocene catalyst of the present disclosure is characterized in that it includes the second metallocene compound represented by Chemical Formula 2 together with the above-described first metallocene compound.

Specifically, in Chemical Formula 2, Z is —$NR_a$—, wherein $R_a$ may be a C1 to C10 hydrocarbyl group. Specifically, $R_a$ may be a C1 to C6 linear or branched alkyl group, and more specifically, it may be a tert-butyl group.

In addition, in Chemical Formula 2, T is

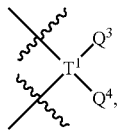

$T^1$ is carbon (C) or silicon (Si), $Q^3$ is a C1 to C30 hydrocarbyl group, or a C1 to C30 hydrocarbyloxy group, and $Q^4$ is a C2 to C30 hydrocarbyloxyhydrocarbyl group. Specifically, $Q^3$ may be a C1 to C10 hydrocarbyl group, and $Q^4$ may be a C2 to C12 hydrocarbyloxyhydrocarbyl group. More specifically, $Q^3$ may be a C1 to C6 alkyl group, and $Q^4$ may be a C1 to C6 alkoxy-substituted alkyl. More specifically, $T^1$ may be silicon (Si), $Q^3$ may be methyl, and $Q^4$ may be tert-butoxy-substituted hexyl.

Specifically, the second metallocene compound may be represented by one of the following Chemical Formulae 2-1 to 2-4.

[Chemical Formula 2-1]

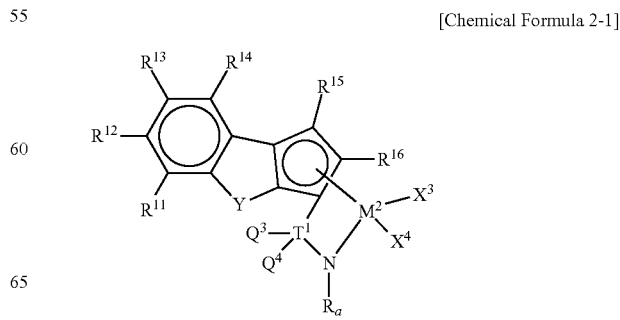

[Chemical Formula 2-2]

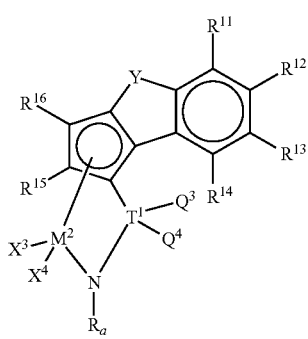

[Chemical Formula 2-3]

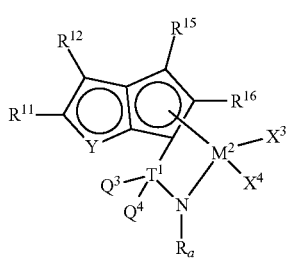

[Chemical Formula 2-4]

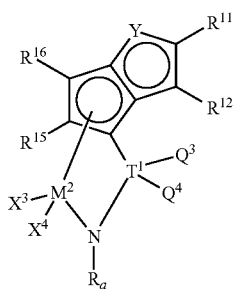

in Chemical Formulae 2-1 to 2-4, $M^2$, $X^3$, $X^4$, $R_a$, $T^1$, $Q^3$, $Q^4$ and $R^{11}$ to $R^{16}$ are the same as defined in Chemical Formula 2.

And, in Chemical Formula 2, each of $R^{11}$ to $R^{14}$ may be hydrogen, or a C1 to C10 hydrocarbyl group, and each of $R^{15}$ and $R^{16}$ may be a C1 to C10 hydrocarbyl group. Specifically, each of $R^{11}$ to $R^{14}$ may be hydrogen or C1 to C10 alkyl, and each of $R^{15}$ and $R^{16}$ may be C1 to C10 alkyl. More specifically, each of $R^{11}$ to $R^{14}$ may be hydrogen or methyl, and $R^{15}$ and $R^{16}$ may be methyl.

In Chemical Formula 2, $M^2$ may be titanium (Ti), zirconium (Zr) or hafnium (Hf), and preferably be titanium (Ti).

In addition, in Chemical Formula 2, each of $X^3$ and $X^4$ may be halogen, a C1 to C10 alkyl group, or a C1 to C6 alkyl group, and specifically be chlorine or methyl.

In addition, in Chemical Formula 2, the second metallocene compound may be represented by one of the following structural formulae.

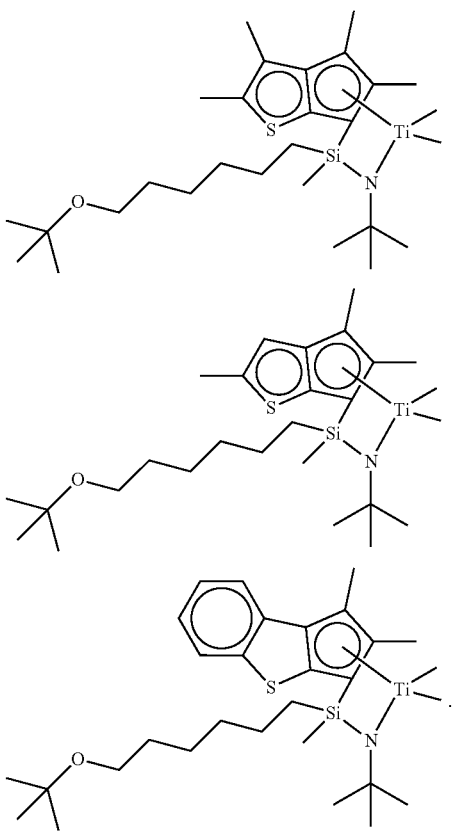

The second metallocene compound represented by the above structural formulae may be synthesized by applying known reactions, and a more detailed synthesis method may be understood with reference to Examples.

Meanwhile, in the hybrid supported metallocene catalyst of the present disclosure, the first metallocene compound may be represented by the following Chemical Formula 1-1, and the second metallocene compound may be represented by one of the following Chemical Formulae 2-1 to 2-4:

[Chemical Formula 1-1]

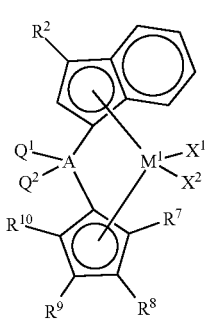

in Chemical Formula 1-1, $M^1$, $X^1$, $X^2$, $R^2$, $R^7$ to $R^{10}$, A, $Q^1$, and $Q^2$ are the same as defined in Chemical Formula 1,

[Chemical Formula 2-1]

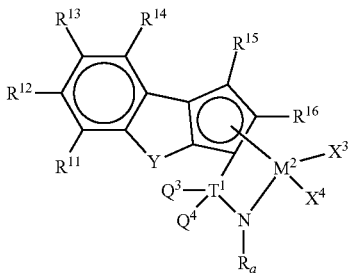

[Chemical Formula 2-2]

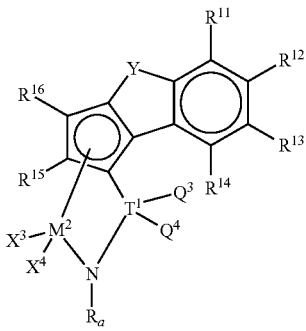

[Chemical Formula 2-3]

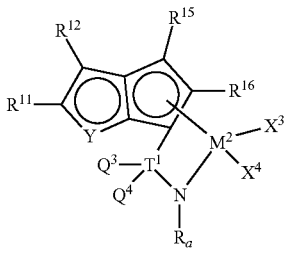

[Chemical Formula 2-4]

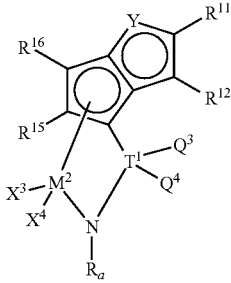

in Chemical Formulae 2-1 to 2-4, $M^2$, $X^3$, $X^4$, $R_a$, $T^1$, $Q^3$, $Q^4$ and $R^{11}$ to $R^{16}$ are the same as defined in Chemical Formula 2.

More specifically, in Chemical Formula 1, $M^1$ is Zr; A is Si; $X^1$ and $X^2$ are both Cl; $R^3$ to $R^{10}$ are hydrogen or methyl; $R^2$ is hydrogen, phenyl, or butyl; $Q^1$ and $Q^2$ are methyl, ethyl, or phenyl. In addition, in Chemical Formula 2, $M^2$ is Zr; $X^3$ and $X^4$ are Cl or methyl; Z is $NR_a$-(wherein $R_a$ is t-butyl); T is $T^1(Q^3)(Q^4)$, wherein $T^1$ is Si, $Q^3$ is methyl, and $Q^4$ is t-butoxyhexyl; $C^1$ is one of Chemical Formulae 2a to 2d; Y is S; and $R^{11}$ to $R^{16}$ are hydrogen or methyl.

In addition, in the hybrid supported metallocene catalyst of the present disclosure, the first metallocene compound and the second metallocene compound may be supported in a molar ratio of 1:2 to 5:1. When including the first and second metallocene compounds in the above-described molar ratio, excellent supporting performance, catalytic activity, and high comonomer incorporation may be exhibited. In particular, when low density polyethylene is produced in a slurry process in the presence of the hybrid supported metallocene catalyst, stability is improved in the process, and thus fouling problems that have occurred in the prior art can be prevented. In addition, a polyolefin having excellent physical properties, for example, low density polyethylene may be provided by using the hybrid supported metallocene catalyst. In particular, when the supporting ratio is less than 1:2, only the first metallocene compound plays a dominant role, making it difficult to reproduce the molecular structure of the desired polymer, and mechanical properties may be reduced. In addition, when the supporting ratio exceeds 5:1, only the second metallocene compound plays a dominant role, thereby reducing processability and shrinkage.

Specifically, the hybrid supported metallocene catalyst in which the first metallocene compound and the second metallocene compound are supported in a molar ratio of 1:1.5 to 3:1, or 1:1 to 2:1 exhibits high activity in ethylene polymerization and high comonomer incorporation, and is preferably used for preparing polyethylene having excellent mechanical properties with improved processability and shrinkage.

That is, the hybrid supported metallocene catalyst of the present disclosure in which the first metallocene compound and the second metallocene compound are supported within the above molar ratio may further improve both the mechanical properties of polyethylene, and the processability and shrinkage due to interaction between the two or more catalysts.

In the hybrid supported metallocene catalyst of the present disclosure, a support containing hydroxyl groups on its surface may be used as the support for supporting the first metallocene compound and the second metallocene compound. Preferably, a support containing highly reactive hydroxyl groups and siloxane groups, which has already been dried to remove moisture on the surface, may be used.

For example, the support may be at least one selected from the group consisting of silica, silica-alumina, or silica-magnesia dried at a high temperature, and commonly contain oxide, carbonate, sulfate, and nitrate such as $Na_2O$, $K_2CO_3$, $BaSO_4$, $Mg(NO_3)_2$, and the like.

A drying temperature of the support may preferably be about 200 to 800° C., more preferably about 300 to 600° C., and most preferably about 300 to 400° C. When the drying temperature of the support is less than 200° C., surface moisture may react with the cocatalyst to be described later due to excessive moisture. When it is greater than 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be about 0.1 to 10 mmol/g, more preferably about 0.5 to 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups are less than about 0.1 mmol/g, the reaction sites with the cocatalyst may be little, and when it is greater than about 10 mmol/g, there is a possibility of being derived from moisture other than hydroxyl groups on the surface of the support particle, which is not preferable.

For example, a total amount of the first and second metallocene compounds supported on a support such as silica, that is, a supported amount of the metallocene compounds may be 0.01 to 1 mmol/g based on 1 g of the support. That is, it is preferable to control the amount within the above-described range in consideration of the effect that the metallocene compound contributes to the catalyst.

Meanwhile, the hybrid supported metallocene catalyst may be one in which at least one of the first metallocene compound and at least one of the second metallocene compound are supported on a support together with a cocatalyst compound. The cocatalyst may be any cocatalyst which is used for polymerization of olefins in the presence of a general metallocene catalyst. This cocatalyst enables bonding between the hydroxyl group and the Group 13 transition metal in the support. In addition, since the cocatalyst is present only on the surface of the support, it can contribute to achieving intrinsic properties of the specific hybrid catalyst composition of the present disclosure without a fouling phenomenon in which polymer particles are agglomerated to the reactor wall or with each other.

In addition, the hybrid supported metallocene catalyst of the present disclosure may further include at least one cocatalyst selected from the group consisting of compounds represented by the following Chemical Formulae 3 to 5.

$$-[Al(R^{31})-O]_c-$$ [Chemical Formula 3]

in Chemical Formula 3,
$R^{31}$ are each independently halogen, $C_{1-20}$ alkyl, or $C_{1-20}$ haloalkyl, and
c is an integer of 2 or more, $$D(R^{41})_3$$ [Chemical Formula 4]

in Chemical Formula 4,
D is aluminum or boron, and
$R^{41}$ are each independently hydrogen, halogen, $C_{1-20}$ hydrocarbyl or $C_{1-20}$ hydrocarbyl substituted with halogen, $$[L-H]^+[Q(E)_4]^- \text{ or } [L]^+[Q(E)_4]^-$$ [Chemical Formula 5]

in Chemical Formula 5,
L is a neutral or cationic Lewis base,
$[L-H]^+$ is a bronsted acid,
Q is $B^{3+}$ or $Al^{3+}$, and
E are each independently $C_{6-40}$ aryl or $C_{1-20}$ alkyl unsubstituted or substituted with a substituent selected from the group consisting of halogen, $C_{1-20}$ alkyl, $C_{1-20}$ alkoxy, and $C_{6-40}$ aryloxy.

The compound represented by Chemical Formula 3 may be alkylaluminoxane such as modified methyl aluminoxane (MMAO), methyl aluminoxane (MAO), ethylaluminoxane, isobutylaluminoxane, butylaluminoxane, and the like.

The alkyl metal compound represented by Chemical Formula 4 may be trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

The compound represented by Chemical Formula 5 may be triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, or the like.

In addition, the hybrid supported metallocene catalyst may include the cocatalyst and the first metallocene compound in a molar ratio of about 1:1 to about 1:10000, preferably about 1:1 to about 1:1000, more preferably about 1:10 to about 1:100.

In addition, the hybrid supported metallocene catalyst may include the cocatalyst and the second metallocene compound in a molar ratio of about 1:1 to about 1:10000, preferably about 1:1 to about 1:1000, more preferably about 1:10 to about 1:100.

At this time, if the molar ratio is less than about 1, the metal content of the cocatalyst is too small, so catalytically active species are not well formed, resulting in low activity. If the molar ratio exceeds about 10000, the metal of the cocatalyst act as a catalyst poison.

The cocatalyst may be supported in an amount of about 5 mmol to about 20 mmol based on 1 g of the support.

Meanwhile, the hybrid supported metallocene catalyst may be prepared by a method including the steps of supporting a cocatalyst on a support; supporting a first metallocene compound on the support on which the cocatalyst is supported; and supporting a second metallocene compound on the support on which the cocatalyst and the first metallocene compound are supported.

Alternatively, the hybrid supported metallocene catalyst may be prepared by a method including the steps of supporting a cocatalyst on a support; supporting a second metallocene compound on the support on which the cocatalyst is supported; and supporting a first metallocene compound on the support on which the cocatalyst and the second metallocene compound are supported.

Alternatively, the hybrid supported metallocene catalyst may be prepared by a method including the steps of supporting a first metallocene compound on a support; supporting a cocatalyst on the support on which the first metallocene compound is supported; and supporting a second metallocene compound on the support on which the cocatalyst and the first metallocene compound are supported.

In the above method, the supporting conditions are not particularly limited and the supporting step may be carried out within a range well known to those skilled in the art. For example, the supporting step may be carried out at a high temperature and at a low temperature appropriately. For example, the supporting temperature may be in a range of about −30° C. to about 150° C., preferably in a range of about 50° C. to about 98° C., or about 55° C. to about 95° C. The supporting time may be appropriately controlled depending on the amount of the first metallocene compound to be supported. The reacted supported catalyst may be used without further treatment after the reaction solvent is removed through filtration or distillation under reduced pressure, or subjected to Soxhlet filtering using aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. It is preferable to use hexane, heptane, toluene, or dichloromethane.

Meanwhile, there is provided a process for preparing a polyethylene copolymer, including the step of copolymerizing ethylene and alpha-olefin in the presence of the above hybrid supported metallocene catalyst.

The above-described hybrid supported metallocene catalyst may exhibit excellent supporting performance, catalytic activity, and high comonomer incorporation. Thus, even when low density polyethylene is produced in a slurry process in the presence of the hybrid supported metallocene catalyst, conventional problems of poor productivity and fouling can be prevented and process stability can be improved.

The process for preparing the polyethylene copolymer may be performed by slurry polymerization with a conventional apparatus and contacting technique using ethylene and alpha-olefin as raw materials in the presence of the above-described hybrid supported metallocene catalyst.

The process for preparing the polyethylene copolymer may be performed by copolymerizing ethylene and alpha-olefin using a continuous slurry polymerization reactor, a loop slurry reactor, or the like, but is not limited thereto.

In addition, the alpha-olefin may be at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene, 1-eicosene, and a mixture thereof.

Specifically, in the process for preparing the polyethylene copolymer, for example, 1-hexene may be used as the alpha-olefin. Accordingly, in the slurry polymerization, a low density polyethylene copolymer may be prepared by polymerizing ethylene and 1-hexene.

In addition, the polymerization may be performed at a temperature of about 25° C. to about 500° C., about 25° C. to about 300° C., about 30° C. to about 200° C., about 50° C. to about 150° C., or about 60° C. to about 120° C. In addition, the polymerization may be performed at a pressure of about 1 kgf/cm$^2$ to about 100 kgf/cm$^2$, about 1 kgf/cm$^2$ to about 50 kgf/cm$^2$, about 5 kgf/cm$^2$ to about 45 kgf/cm$^2$, about 10 kgf/cm$^2$ to about 40 kgf/cm$^2$, or about 15 kgf/cm$^2$ to about 35 kgf/cm$^2$.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

As described above, the polyethylene copolymer according to the present disclosure may be prepared by copolymerizing ethylene and alpha-olefin using the above-described supported metallocene catalyst.

Herein, the polyethylene to be prepared may be an ethylene-1-hexene copolymer.

According to another embodiment of the present disclosure, there is provided a polyethylene copolymer obtained by the above-described process.

The process for preparing the polyethylene copolymer may provide a polyethylene copolymer having excellent mechanical properties by performing slurry polymerization in the presence of the above-described hybrid supported metallocene catalyst.

In particular, the above-described hybrid supported metallocene catalyst can provide a polyethylene copolymer having excellent mechanical properties while preventing problems related to a decrease in productivity and fouling that occur conventionally when a low density polyethylene copolymer is prepared by slurry polymerization. Accordingly, a melt index ($MI_{2.16}$, 190° C., measured under a load of 2.16 kg) of the polyethylene may be 0.2 g/10 min to 3.0 g/10 min, 0.2 g/10 min to 0.5 g/10 min, 0.24 g/10 min to 0.4 g/10 min, or 0.27 g/10 min to 0.30 g/10 min.

And, the polyethylene copolymer may have a density of 0.913 g/cm$^3$ to 0.930 g/cm$^3$, 0.920 g/cm$^3$ to 0.930 g/cm$^3$, 0.925 g/cm$^3$ to 0.930 g/cm$^3$, or 0.928 g/cm$^3$ to 0.930 g/cm$^3$.

Meanwhile, the polyethylene copolymer may have a molecular weight distribution (Mw/Mn) of 2 or more or 2 to 4.5, 2.5 or more or 2.5 to 4, or 2.8 or more or 2.8 to 3.5.

For example, the molecular weight distribution (Mw/Mn) can be calculated by dividing the weight average molecular weight (Mw) by the number average molecular weight (Mn) after measuring the weight average molecular weight (Mw) and the number average molecular weight (Mn) using gel permeation chromatography (GPC, manufactured by Water).

Specifically, the weight average molecular weight (Mw) and the number average molecular weight (Mn) of the polyethylene copolymer can be measured by converting with a polystyrene standard specimen using gel permeation chromatography (GPC). For example, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT at 160° C. for 10 hours using a GPC analyzer (PL-GP220), and the sample with a concentration of 10 mg/10 mL may be supplied in an amount of 200 µL. Mw and Mn may be obtained using a calibration curve formed using a polystyrene standard. 9 kinds of the polystyrene standard may be used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

The polyethylene copolymer may have a weight average molecular weight of about 90000 g/mol or more or about 90000 g/mol to about 130000 g/mol, about 95000 g/mol or more or about 95000 g/mol to about 125000 g/mol, or about 97000 g/mol or more or about 97000 g/mol to about 120000 g/mol.

Although the polyethylene copolymer has a relatively wide molecular weight distribution, it is possible to exhibit high mechanical properties by controlling the molecular structure.

In particular, the polyethylene copolymer has a BOCD index (Broad Orthogonal Co-monomer Distribution Index) of 0.5 or more, or 0.5 to 1.0.

In the present disclosure, the BOCD structure means a structure in which comonomers such as alpha-olefin are incorporated predominantly in high-molecular-weight main chains, that is, a structure in which the SCB (short chain branch) content increases as the molecular weight increases.

Herein, the short chain branch (SCB) refers to a branch having 2 to 7 carbon atoms.

The weight average molecular weight, molecular weight distribution, and SCB content are measured simultaneously and continuously by GPC-FTIR instrument, and the BOCD index may be calculated based on the following Equation 1 through a molecular weight distribution curve obtained by plotting a log value (log M) of a weight average molecular weight (M) on the x-axis, and a molecular weight distribution (dwt/dlog M) with respect to the log value on the y-axis, and then measuring the SCB (short chain branch) content (content of branches having 2 to 7 carbon atoms per 1,000 carbons, unit: branch/1,000 C) at the left and right borders of centered 60% area excluding 20% of the left and right ends in the total area. In this regard, the SCB content at high molecular weight side and the SCB content at low molecular weight side mean SCB content values at the left and right borders of centered 60% area excluding 20% of the left and right ends, respectively.

$$BOCD\ Index = \frac{\left(\begin{array}{c} SCB\ \text{content at high molecular weight side} - \\ SCB\ \text{content at low molecular weight side} \end{array}\right)}{(SCB\ \text{content at low molecular weight side})}$$

[Equation 1]

If the BOCD index is 0 or less, it can be considered that the polymer has no BOCD structure, and if the BOCD index is more than 0, it can be considered that the polymer has the BOCD structure. The larger the value, the higher the SCB (short chain branch) content at high molecular weight side.

As the polyethylene copolymer according to an embodiment of the present disclosure has a BOCD index of 0.5 to 1.0, it has high comonomer content at the high molecular weight side, and as a result, may exhibit excellent properties such as film strength. More specifically, the polyethylene copolymer has a BOCD index of 0.55 or more, or 0.58 or more, and 0.9 or less, or 0.75 or less.

Herein, the polyethylene copolymer has a SCB (short chain branch) content, that is, a content of branches having 2 to 7 carbon atoms per 1000 carbons (unit: branch/1000 C) of 8.5 to 20. More specifically, the polyethylene copolymer has the SCB (short chain branch) content of 8.8 branches/1000 C or more, or 9.1 branches/1000 C or more, and 15 branches/1000 C or less, or 11 branches/1000 C or less.

For example, the SCB (short chain branch) content of the polyethylene copolymer may be measured using GPC-FTIR instrument. A measuring method is the same as commonly known in the art, so the specific measuring method is omitted. The measurement may be performed with reference to the method described in Test Example 2 to be described later.

Meanwhile, the polyethylene copolymer may have a LCB (long chain branch) content, that is, a content of branches having 8 or more, or 8 to 60 carbon atoms per 1,000 carbons (unit: branch/1000 C) of 0.02 or more, or 0.02 to 0.05. More specifically, the polyethylene copolymer may have the LCB (long chain branch) content of 0.023 branches/1000 C or more, 0.025 branches/1000 C or more, and 0.04 branches/1000 C or less, or 0.035 branches/1000 C or less.

For example, the LCB (long chain branch) content of the polyethylene copolymer may be measured using a rotational rheometer and GPC. A measuring method is the same as commonly known in the art, so the specific measuring method is omitted. The measurement may be performed with reference to the method described in Test Example 2 to be described later.

According to another embodiment of the present disclosure, there is provided a blown film containing the above-described polyethylene copolymer.

In particular, although the polyethylene copolymer has a relatively wide molecular weight distribution, it is possible to exhibit high mechanical properties by controlling the molecular structure. Accordingly, the blown film may have drop impact resistance of about 580 g or more or about 580 g to about 800 g, about 585 g or more or about 585 g to about 700 g, or about 590 g or more or about 590 g to about 670 g, when measured in accordance with the American Society for Testing and Materials standard ASTM D 1709. In addition, the shrinkage in the mold direction (MD) may be 50% or more (MD direction), 55% or more (MD direction), or 60% or more (MD direction), and the shrinkage in the transverse direction (TD) may be 18% or more (TD direction), 19% or more (TD direction), or 19.9% or more (TD direction), when measured in accordance with the American Society for Testing and Materials standard ASTM D 2732.

Accordingly, the blown film containing the polyethylene copolymer of the present disclosure can be used for various applications requiring such physical properties, and in particular, it can be used for agricultural/industrial and packaging applications requiring high drop impact resistance. It can also be used for shrink films where it is difficult to apply conventional low density polyethylene or high density polyethylene.

Advantageous Effects

The hybrid supported metallocene catalyst according to the present disclosure exhibits excellent process stability and high activity for ethylene polymerization, and can prepare a polyethylene copolymer having excellent shrinkage and processability with excellent mechanical properties by introducing short chain branch (SCB) and long chain branch (LCB) to change the molecular structure and the distribution.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

EXAMPLES

Preparation of First Metallocene Compound

Synthesis Example 1

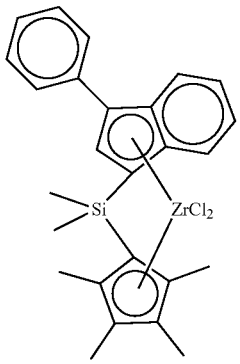

Tetramethylcyclopentadiene (TMCP) was filtered after lithiation with n-BuLi (1 eq.) in tetrahydrofuran (THF, 0.4 M), and used as TMCP-Li salts. 3-PhenylIndene (3-Ph-Ind) was filtered after lithiation with n-BuLi (1 eq.), and used as 3-Ph-Ind-Li salts. 50 mmol of TMCP-Li salts and 100 mL of THF were added to a 250 mL schlenk flask under Ar. 1 eq. of $(CH_3)_2SiCl_2$ was added thereto at −20° C. After 6 hours, 3 mol % of CuCN and 3-Ph-Ind-Li salts (50 mmol, MTBE 1 M solution) were added at −20° C. and reacted for 12 hours. Organic layers were separated with water and hexane to obtain a ligand.

The synthesized ligand (50 mmol) was dissolved in 100 mL of menthyl tert-butyl ether (MTBE) under Ar, and 2 eq. of n-BuLi was added dropwise at −20° C. After 16 hours of reaction, a ligand-Li solution was added to $ZrCl_4(THF)_2$ (50 mmol, MTBE 1 M solution). After 16 hours of reaction, the solvent was removed, and the residue was dissolved in methylene chloride (MC) to remove LiCl. The solvent of the filtrate was removed, 80 mL of tert-Butyl methyl ether (MTBE) was added thereto, and then stirred for 2 hours, followed by filtration to obtain a solid catalyst precursor (yield 40%).

$^1$H NMR (500 MHz, C6D6): 0.78 (3H, s), 0.97 (3H, s), 1.64 (3H, s), 1.84 (3H, s), 1.88 (6H, 2s), 5.91 (1H, s), 6.89 (1H, t), 7.19 (1H, t), 7.25 (1H, t), 7.30 (2H, t), 7.37 (1H, d), 7.74 (2H, d), 7.93 (1H, d).

Synthesis Example 2

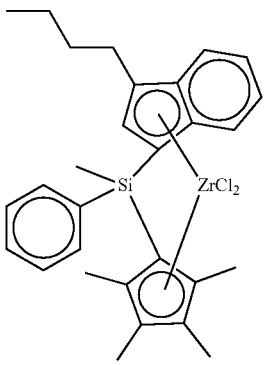

Tetramethylcyclopentadiene (TMCP) was filtered after lithiation with n-BuLi (1 eq.) in tetrahydrofuran (THF, 0.4 M), and used as TMCP-Li salts. 50 mmol of TMCP-Li salts and 100 mL of THF were added to a 250 mL schlenk flask under Ar. 1 eq. of $(CH_3)(phenyl)SiCl_2$ was added thereto at −20° C. 50 mmol of 3-butylindene (3-BuInd) and 100 mL of THF were added to another 250 mL schlenk flask under Ar, and 1 eq. of n-BuLi was added dropwise at −20° C. After 16 hours, 3 mol % of CuCN was added to a lithiated 3-BuInd solution, and stirred for 30 minutes. This solution was added to the first flask at −20° C., and reacted for 12 hours. Organic layers were separated with water and hexane to obtain a ligand. The synthesized ligand (50 mmol) was dissolved in 100 mL of MTBE under Ar, and 2 eq. of n-BuLi was added dropwise at −20° C. After 16 hours of reaction, a ligand-Li solution was added to $ZrCl_4(THF)_2$ (50 mmol, MTBE 1 M solution). After 16 hours of reaction, the solvent was removed, and the residue was dissolved MC to remove LiCl. The solvent of the filtrate was removed, 50 mL of MTBE and 100 mL of hexane were added thereto, and then stirred for 2 hours, followed by filtration to obtain a solid catalyst precursor.

$^1$H NMR (500 MHz, CDCl₃): 0.93 and 0.88 (3H, 2t), 1.26 and 1.02 (3H, 2s), 1.46 and 1.55 (3H, 2s), 1.44-1.51 (2H, m), 1.55-1.60 (2H, m), 1.89 and 1.92 (3H, 2s), 1.98 and 2.03 (3H, 2s), 2.01 and 2.05 (3H, 2s), 2.52 and 2.86 (1H, 2m), 2.92-2.98 (1H, m), 5.65 (1H, s), 7.23 (1H, m), 6.87 and 7.38 (1H, 2t), 7.30-7.48 (1H, 2t), 7.59 and 7.63 (1H, 2d), 7.52-7.58 (3H, m), 7.96-8.03 (2H, dd).

Synthesis Example 3

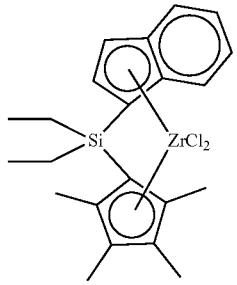

Tetramethylcyclopentadiene (TMCP) was filtered after lithiation with n-BuLi (1 eq.) in tetrahydrofuran (THF, 0.4 M), and used as TMCP-Li salts. 50 mmol of TMCP-Li salts and 100 mL of THF were added to a 250 mL schlenk flask under Ar. 1 eq. of $(CH_2CH_3)_2SiCl_2$ was added thereto at −20° C. 50 mmol of indene (Ind) and 100 mL of THF were added to another 250 mL schlenk flask under Ar, and 1 eq. of n-BuLi was added dropwise at −20° C. After 16 hours, 3 mol % of CuCN was added to a lithiated Ind solution, and stirred for 30 minutes. This solution was added to the first flask at −20° C., and reacted for 12 hours. Organic layers were separated with water and hexane to obtain a ligand. The synthesized ligand (50 mmol) was dissolved in 100 mL of MTBE under Ar, and 2 eq. of n-BuLi was added dropwise at −20° C. After 16 hours of reaction, a ligand-Li solution was added to $ZrCl_4(THF)_2$ (50 mmol, MTBE 1 M solution). After 16 hours of reaction, the solvent was removed, and the residue was dissolved in tetrachloromethane (MC) to remove LiCl. The solvent of the filtrate was removed, 50 mL of MTBE and 100 mL of hexane were added thereto, and then stirred for 2 hours, followed by filtration to obtain a solid catalyst precursor.

Comparative Synthesis Example 1

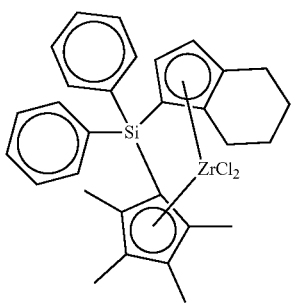

TMCP-Li (1.3 g, 10 mmol), CuCN (45 mg, 5 mol %), and THF (10 mL) were added to a dried 250 mL schlenk flask. Then, the temperature of the flask was cooled to −20° C. or less, dichlorodiphenylsilane (2.5 g, 10 mmol) was added dropwise, and the resulting mixture was stirred at room temperature (RT, about 22-25° C.) for 16 hours. Then, the temperature of the flask was cooled to −20° C. or less, an indene-lithiation solution (1.2 g, 10 mmol in THF 10 mL) was added dropwise, and the resulting mixture was stirred at room temperature for 24 hours. Thereafter, the obtained solution was dried under reduced pressure to remove the solvent from the solution. Then, the obtained solid was dissolved in hexane, filtered to remove remaining LiCl, and the filtrate was dried under reduced pressure to remove hexane from the filtrate to obtain diphenyl(indenyl)(tetramethylcyclopentadienyl)silane. In a 100 mL schlenk flask, the previously synthesized diphenyl(indenyl)(tetramethylcyclopentadienyl)silane (4.2 g, 10 mmol) was dissolved in THF (15 mL). Then, the solution was cooled to −20° C. or less, n-BuLi (2.5 M in hexane, 8.4 mL, 21 mmol) was slowly added dropwise to the solution, and the resulting solution was stirred at room temperature for 6 hours.

Meanwhile, ZrCl$_4$(THF)$_2$ (3.8 g, 10 mmol) was dispersed in toluene (15 mL) in a separately prepared 250 mL schlenk flask, and the resulting mixture was stirred at −20° C. Then, the previously prepared lithiated ligand solution was slowly injected into the mixture. Then, the resulting mixture was stirred at room temperature for 48 hours. Thereafter, the resulting solution was dried under reduced pressure to remove the solvent from the solution. Then, the obtained solid was dissolved in dichloromethane (DCM), filtered to remove remaining LiCl, and the filtrate was dried under reduced pressure to remove DCM. Thereafter, the obtained solid was added to 30 mL of toluene, stirred for 16 hours, and then filtered. Diphenylsilylene(tetramethylcyclopentadienyl) (indenyl)zirconium dichloride (2.1 g, 3.6 mmol) in the form of lemon solid was obtained (36% yield).

$^1$H NMR (500 MHz, CDCl$_3$): 8.08-8.12 (2H, m), 7.98-8.05 (2H, m), 7.77 (1H, d), 7.47-7.53 (3H, m), 7.42-7.46 (3H, m), 7.37-7.41 (2H, m), 6.94 (1H, t), 6.23 (1H, d), 1.98 (3H, s), 1.95 (3H, s), 1.68 (3H, s), 1.52 (3H, s).

The previously synthesized diphenylsilylene(tetramethylcyclopentadienyl) (indenyl)-zirconium dichloride (1.0 g, 1.7 mmol), Pd/C (10 mol %), and DCM (40 mL) were injected into a 100 mL high-pressure reactor, and hydrogen was charged to a pressure of about 60 bar. Then, the mixture contained in the high-pressure reactor was stirred at about 80° C. for about 24 hours. After completion of the reaction, the reaction product was passed through a celite pad to remove solids from the reaction product, and diphenylsilylene(tetramethylcyclopentadienyl)(tetrahydroindenyl)zirconium dichloride was obtained (0.65 g, 1.1 mmol, 65% yield).

$^1$H NMR (500 MHz, CDCl$_3$): 7.90-8.00 (4H, m), 7.38-7.45 (6H, m), 6.80 (1H, s), 5.71 (1H, s), 3.15-3.50 (1H, m), 2.75-2.85 (1H, m), 2.50-2.60 (1H, m), 2.12 (3H, s), 2.03 (3H, s), 1.97-2.07 (1H, m), 1.76 (3H, s), 1.53-1.70 (4H, m), 1.48 (3H, s).

Comparative Synthesis Example 2

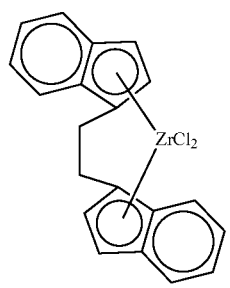

A transition metal compound (dichloro[rac-ethylenebis(indenyl)]zirconium(IV)) having the above structural formula was prepared as a first metallocene compound (purchased from Sigma-Aldrich, CAS Number: 100080-82-8).

Comparative Synthesis Example 3

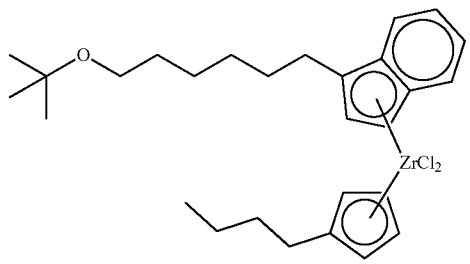

(1) Preparation of Ligand Compound

After adding 10.8 g (100 mmol) of chlorohexanol in a dried 250 mL schlenk flask, 10 g of molecular sieve and 100 mL of MTBE (methyl tert-butyl ether) were added thereto, and 20 g of sulfuric acid was slowly added over 30 minutes. The reaction mixture slowly turned pink with time. After 16 hours, it was poured into a saturated sodium bicarbonate (Na$_2$CO$_3$) aqueous solution chilled on ice. The mixture was extracted 4 times using 100 mL of ether at a time, and collected organic layers were dried with MgSO$_4$, and filtered. Then, the solvent was removed under vacuum reduced pressure to obtain 10 g of 1-(tert butoxy)-6-chlorohexane in the form of yellow liquid (60% yield).

1H NMR (500 MHz, CDCl$_3$): 3.53 (2H, t), 3.33 (2H, t), 1.79 (2H, m), 1.54 (2H, m), 1.45 (2H, m), 1.38 (2H, m), 1.21 (9H, s).

4.5 g (25 mmol) of the previously synthesized 1-(tert butoxy)-6-chlorohexane was added to a dried 250 mL schlenk flask, and dissolved in 40 mL of THF. 20 mL of sodium indenide THF solution was slowly added thereto and stirred for one day. The reaction mixture was quenched by adding 50 mL of water, extracted with diethyl ether (50 mL×3), and then collected organic layers were sufficiently washed with brine. The remaining moisture was dried with MgSO₄, and filtered. Then, the solvent was removed under vacuum reduced pressure to obtain 3-(6-tert-butoxy hexyl)-1H-indene, a dark brown viscous product, in quantitative yield.

Mw=272.21 g/mol

¹H NMR (500 MHz, CDCl₃): 7.47 (1H, d), 7.38 (1H, d), 7.31 (1H, t), 7.21 (1H, t), 6.21 (1H, s), 3.36 (2H, m), 2.57 (2H, m), 1.73 (2H, m), 1.57 (2H, m), 1.44 (6H, m), 1.21 (9H, s).

(2) Preparation of Transition Metal Compound 5.44 g (20 mmol) of the previously synthesized 3-(6-tert-butoxy hexyl)-1H-indene was added to a dried 250 mL schlenk flask, and dissolved in 60 mL of diethyl ether. 13 mL of a 2.0M hexane solution of n-BuLi was added thereto, and stirred for one day. Then, a toluene solution of n-butyl cyclopentadiene ZrCl₃ (concentration: 0.378 mmol/g) was slowly added at −78° C. When the reaction mixture was heated to room temperature, it changed from a clear brown solution to a white suspension in which yellow solids floated. After 12 hours, 100 mL of hexane was added to the reaction mixture to form an additional precipitate. Then, it was filtered under argon to obtain a yellow filtrate, which was dried to obtain the desired compound of 3-(6-(tert-butoxy)hexyl)-1H-inden-1-yl)(3-butylcylcopenta-2,4-dien-1-yl) zirconium(IV) chloride.

Mw=554.75 g/mol

¹H NMR (500 MHz, CDCl₃): 7.62 (2H, m), 7.24 (2H, m), 6.65 (1H, s), 6.39 (1H, s), 6.02 (1H, s), 5.83 (1H, s), 5.75 (1H, s), 3.29 (2H, m), 2.99 (1H, m), 2.89 (1H, m), 2.53 (1H, m), 1.68 (2H, m), 1.39-1.64 (10H, m), 1.14 (9H, s), 0.93 (4H, m).

<Preparation of Second Metallocene Compound>

Synthesis Example 4

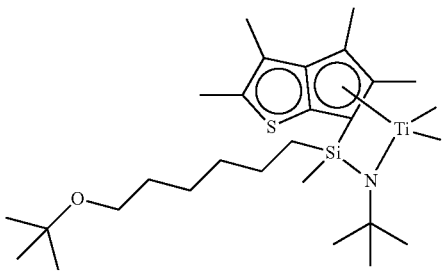

(1) Synthesis of (E)-1-(4,5-dimethylthiophen-2-yl)-2-methylbut-2-en-1-one(E)-1-(4,5-dimethylthiophen-2-yl)-2-methylbut-2-en-1-one

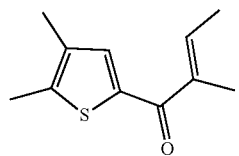

9.99 g (89.1 mmol) of 2,3-dimethylthiophene was quantified in a schlenk flask, and then 90 mL of THF was added thereto for dissolution. After dropwise addition of n-BuLi (1.05 eq, 37.4 mL) at −78° C., the reaction was carried out at room temperature (RT) overnight. After quantifying CuCN (0.5 eq, 4 g) in another schlenk flask, 30 mL of THF was added thereto. Then, the temperature was lowered to −78° C., and the reaction solution was transferred. After 2 hours of reaction at RT, tigloyl chloride (1 eq, 9.8 mL) was added dropwise at −78° C. After overnight reaction at RT and work-up with Na₂CO₃ aqueous solution and ethyl acetate (EA), organic layers were concentrated to obtain 15.48 g of a brown liquid product in a yield of 89.5%.

¹H-NMR (in CDCl₃, 500 MHz): 7.94 (s, 1H), 7.17-7.16 (m, 1H), 3.04 (s, 3H), 2.81 (s, 3H), 2.59 (s, 3H), 2.53 (d, 3H).

(2) Synthesis of 2,3,4,5-tetramethyl-4,5-dihydro-6H-cyclopenta[b]thiophen-6-one

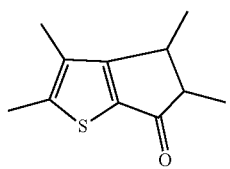

15.48 g (79.7 mmol) of previously obtained (E)-1-(4,5-dimethylthiophen-2-yl)-2-methylbut-2-en-1-one was quantified in a 1 L round-bottom flask (one neck). After that, 15 mL of chlorobenzene was added thereto and stirred. After pouring 100 mL of sulfuric acid, the reaction was carried out overnight at RT. 800 mL of deionized water (DIW) was added, stirred, and then transferred to a separate panel, followed by extraction with EA. The organic layers were washed with a Na₂CO₃ aqueous solution, and then concentrated to obtain 10.66 g of a reddish brown oil product in a yield of 68.9%.

¹H-NMR (in CDCl₃, 500 MHz): 6.28 (s, 2H), 6.35 (s, 1H), 3.33-3.32 (m, 4H), 2.48 (s, 6H), 2.36 (s, 6H), 1.97 (d, 6H), 1.51 (s, 18H), 1.46-1.26 (m, 20H), 1.18 (m, 18H), 0.49 (s, 3H), 0.46 (s, 3H), 0.31 (s, 6H), 0.00 (s, 3H), −0.20 (s, 3H).

(3) Synthesis of 2,3,4,5-tetramethyl-6H-cyclopenta[b]thiophene

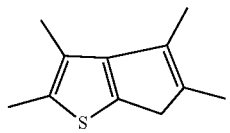

3 g (15.4 mmol) of previously obtained 2,3,4,5-tetramethyl-4,5-dihydro-6H-cyclopenta[b]thiophen-6-one was quantified in a vial, and then 18 mL of THF and 12 mL of methanol (MeOH) were added thereto for dissolution. The vial was immersed in ice water at 0° C., and NaBH₄ (1.5 eq, 876 mg) was added slowly with a spatula while stirring. After overnight reaction at RT, DIW was added, and the organic layers were separated and concentrated. THF and DIW were mixed in 1:1, 60 mL each, and 12 mL of 3N HCl was added to dissolve the mixture, followed by heating at 80° C. for 3 hours. Hexane and DIW were added, and organic layers were separated, followed by neutralization with a Na$_2$CO$_3$ aqueous solution. Then, the organic layers were concentrated to obtain 2.3 g of a brown liquid product in a yield of 83.5%.

$^1$H-NMR (in CDCl$_3$, 500 MHz): 6.28 (s, 2H), 3.15 (m, 1H), 3.05 (m, 1H), 2.37 (s, 6H), 2.16 (s, 6H), 2.16 (s, 6H), 2.03 (s, 6H), 1.28 (d, 6H).

(4) Synthesis of 1-(6-(tert-butoxy)hexyl)-N-(tert-butyl)-1-methyl-1-(2,3,4,5-tetramethyl-6H-cyclopenta[b]thiophen-6-yl)silanamine

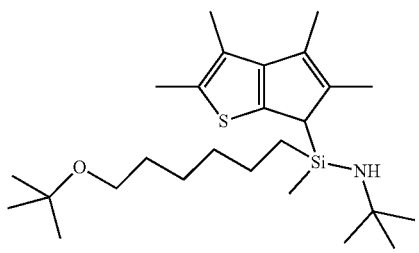 [SMILES: CC1=C(C)C([Si](C)(CCCCCCOC(C)(C)C)NC(C)(C)C)c2sc(C)c(C)c21]

2.3 g (12.9 mmol) of previously obtained 2,3,4,5-tetramethyl-6H-cyclopenta[b]thiophene was quantified in a schlenk flask, and then 65 mL of THF was added thereto for dissolution, followed by dropwise addition of n-BuLi (1.05 eq, 5.4 mL) at −78° C. After overnight reaction at RT, (6-(tert-butoxy)hexyl)methyl silane (tether silane, 1.05 eq, 3.7 mL) was quantified in another schlenk flask. Then, 30 mL of THF was added thereto, and the temperature was lowered to 0° C. After transfer to the reaction solution, it was reacted overnight at RT. The solvent was dried by distillation under reduced pressure, filtered with hexane, and then concentrated. Then, 30 mL of t-BuNH$_2$ was added, followed by reaction at RT overnight. After distillation under reduced pressure, the solvent was dried, filtered with hexane, and concentrated to obtain 5 g of a brown oil product in a yield of 86.2%.

$^1$H-NMR (in CDCl$_3$, 500 MHz): 3.32 (m, 4H), 2.35 (s, 6H), 2.25 (s, 6H), 2.11 (s, 6H), 2.07 (s, 3H), 2.05 (s, 3H), 1.51-1.27 (m, 20H), 1.19 (s, 36H), 0.15 (s, 3H), 0.0 (s, 3H).

(5) Synthesis of Silane Bridged Dimethyl Titanium Compound

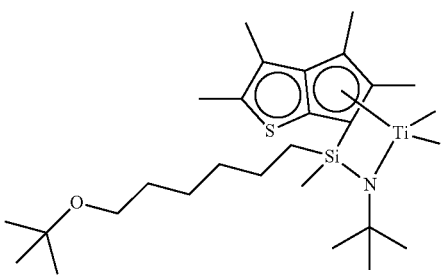

2.97 g (6.6 mmol) of previously obtained 1-(6-(tert-butoxy)hexyl)-N-(tert-butyl)-1-methyl-1-(2,3,4,5-tetramethyl-6H-cyclopenta[b]thiophen-6-yl)silanamine was quantified in a schlenk flak, and then 33 mL of MTBE was added thereto for dissolution. After dropwise addition of n-BuLi (2.05 eq, 5.4 mL) at −78° C., the reaction was carried out at room temperature (RT) overnight. MMB (2.5 eq, 5.5 mL) and TiCl$_4$ (1 eq, 6.6 mL) were added dropwise at −78° C., followed by reaction overnight at RT. After vacuum drying and filtering with hexane, DME (3 eq, 2.1 mL) was added dropwise. After overnight reaction at RT, the solvent was vacuum-dried, filtered with hexane, and concentrated to obtain 2.8 g of a transition metal compound (silane bridged dimethyl titanium compound) in a yield of 81.3%.

$^1$H-NMR (in CDCl$_3$, 500 MHz): 3.32 (m, 4H), 2.47 (s, 3H), 2.34 (s, 6H), 2.30 (s, 6H), 1.95 (s, 3H), 1.50 (s, 18H), 1.40 (s, 6H), 1.31-1.26 (m, 20H), 1.18 (s, 18H), 0.49 (s, 3H), 0.48 (s, 3H), 0.46 (s, 3H), 0.34 (s, 3H), −0.09 (s, 3H) −0.23 (s, 3H).

Synthesis Example 5

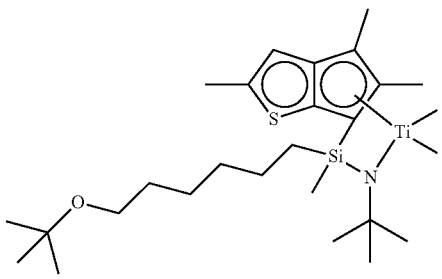

(1) Synthesis of (E)-1-(4,5-dimethylthiophen-2-yl)-2-methylbut-2-en-1-one

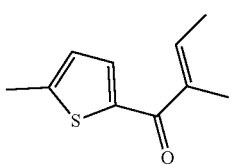

10 g (101.9 mmol) of 2-methylthiophene was quantified in a schlenk flask, and then 100 mL of THF was added thereto for dissolution. After dropwise addition of n-BuLi (1.05 eq, 4.3 mL) at −78° C., the reaction was carried out at room temperature (RT) overnight. After quantifying CuCN (0.5 eq, 4.6 g) in another schlenk flask, 30 mL of THF was added thereto. Then, the temperature was lowered to −78° C., and the reaction solution was transferred. After 2 hours of reaction at RT, tigloyl chloride (1 eq, 11.2 mL) was added dropwise at −78° C. After overnight reaction at RT and work-up with Na$_2$CO$_3$ aqueous solution and EA, organic layers were concentrated to obtain 15.35 g of a brown liquid product in a yield of 83.6%.

$^1$H-NMR (in CDCl$_3$, 500 MHz): 7.37 (s, 1H), 6.52 (s, 1H), 6.52 (d, 1H), 2.52 (s, 3H), 1.93 (s, 3H), 1.87 (d, 3H).

(2) Synthesis of 2,4,5-trimethyl-4,5-dihydro-6H-cyclopenta[b]thiophen-6-one

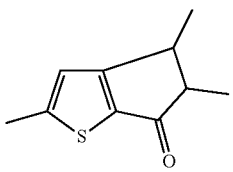

15.35 g (85.2 mmol) of previously obtained (E)-2-methyl-1-(5-methylthiophen-2-yl)but-2-en-1-one was quantified in a 1 L round-bottom flask (one neck). After that, 15 mL of chlorobenzene was added thereto and stirred. After pouring 100 mL of sulfuric acid, the reaction was carried out overnight at RT. 800 mL of deionized water (DIW) was added, stirred, and then transferred to a separate panel, followed by extraction with ethyl acetate (EA). The organic layers were washed with a $Na_2CO_3$ aqueous solution, and then concentrated to obtain 10.38 g of a reddish brown oil product in a yield of 67.6%.

$^1$H-NMR (in $CDCl_3$, 500 MHz): 6.74 (s, 2H), 3.38-3.36 (m, 1H), 3.04-3.01 (m, 1H), 2.83-2.81 (m, 1H), 2.45-2.44 (m, 1H), 1.35 (d, 3H), 1.31 (d, 3H), 1.21-1.19 (m, 6H).

(3) Synthesis of 2,4,5-trimethyl-5,6-dihydro-4H-cyclopenta[b]thiophened

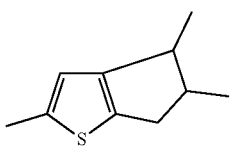

2.5 g (15.2 mmol) of previously obtained 2,4,5-trimethyl-4,5-dihydro-6H-cyclopenta[b]thiophen-6-one was quantified in a vial, and then 20 mL of THF and 7 mL of MeOH were added thereto for dissolution. The vial was immersed in ice water at 0° C., and $NaBH_4$ (1.5 eq, 863 mg) was added slowly with a spatula while stirring. After overnight reaction at RT, DIW was added, and the organic layers were separated and concentrated. THF and DIW were mixed in 1:1, 50 mL each, and 10 mL of 3N HCl was added to dissolve the mixture, followed by heating at 80° C. for 3 hours. Hexane and DIW were added, and organic layers were separated, followed by neutralization with a $Na_2CO_3$ aqueous solution. Then, the organic layers were concentrated to obtain 1.89 g of a red liquid product in a yield of 82.8%.

$^1$H-NMR (in $CDCl_3$, 500 MHz): 6.67 (s, 1H), 6.30 (s, 1H), 3.05-3.03 (m, 1H), 2.50 (s, 3H), 2.03 (s, 3H), 2.02 (d, 3H).

(4) 1-(6-(tert-butoxy)hexyl)-N-(tert-butyl)-1-methyl-1-(2,4,5-trimethyl-6H-cyclopenta[b]thiophen-6-yl)silanamine

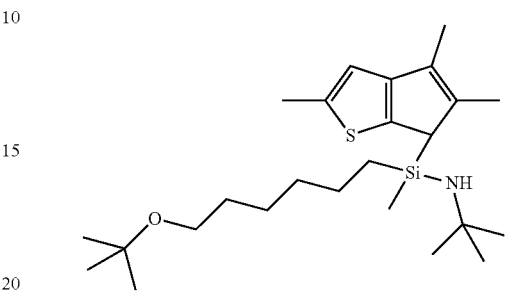

1.89 g (11.5 mmol) of previously obtained 2,4,5-trimethyl-5,6-dihydro-4H-cyclopenta[b]thiophened was quantified in a schlenk flask, and then 57 mL of THF was added thereto for dissolution, followed by dropwise addition of n-BuLi (1.05 eq, 4.8 mL) at −78° C. After overnight reaction at RT, tether silane (1.05 eq, 3.3 g) was quantified in another schlenk flask. Then, 30 mL of THF was added thereto, and the temperature was lowered to 0° C. After transfer to the reaction solution, it was reacted overnight at RT. The solvent was dried by distillation under reduced pressure, filtered with hexane, and then concentrated. Then, 30 mL of t-$BuNH_2$ was added, followed by reaction at RT overnight. After distillation under reduced pressure, the solvent was dried, filtered with hexane, and concentrated to obtain 5 g of a brown grain syrup-like product in a yield of 99.3%.

$^1$H-NMR (in $CDCl_3$, 500 MHz): 6.61 (s, 2H), 3.31-3.28 (m, 4H), 2.51 (s, 6H), 2.09-2.01 (m, 12H), 1.49-1.27 (m, 20H), 1.20 (s, 6H), 1.19 (s, 18H), 1.16 (s, 18H).

(5) Synthesis of Silane Bridged Dimethyl Titanium Compound 2.48 g (5.7 mmol) of previously obtained 1-(6-(tert-butoxy)hexyl)-N-(tert-butyl)-1-methyl-1-(2,4,5-trimethyl-6H-cyclopenta[b]thiophen-6-yl)silanamine was quantified in a schlenk flak, and then 30 mL of MTBE was added thereto for dissolution. After dropwise addition of n-BuLi (2.05 eq, 4.7 mL) at −78° C., the reaction was carried out at room temperature (RT) overnight. MMB (2.5 eq, 4.7 mL) and $TiCl_4$ (1 eq, 5.7 mL) were added dropwise at −78° C., followed by reaction overnight at RT. After vacuum drying and filtering with hexane, DME (3 eq, 1.8 mL) was added dropwise. After overnight reaction at RT, the solvent was vacuum-dried, filtered with hexane, and concentrated to obtain 2.35 g of a transition metal compound (silane bridged dimethyl titanium compound) in a yield of 80.9%.

$^1$H-NMR (in $CDCl_3$, 500 MHz): 6.39 (s, 2H), 3.30 (s, 6H), 2.19 (s, 6H), 1.91 (s, 6H), 1.63-1.59 (m, 4H), 1.55 (s, 18H), 1.49-1.22 (m, 16H), 1.14 (s, 18H), 0.70 (s, 6H), 0.30 (s, 6H), 0.02 (s, 3H).

Comparative Synthesis Example 4

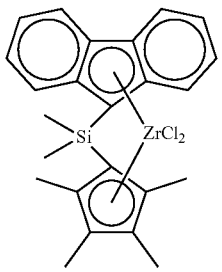

1.622 g (10 mmol) of fluorene was added to a dried 250 mL schlenk flask, and 200 mL of THF was injected under argon. Then, after the resulting solution was cooled to 0° C., n-BuLi (2.5 M in hexane, 4.8 mL, 12 mmol) was slowly added dropwise. Thereafter, the temperature of the reaction mixture was slowly raised to room temperature, and then the reaction mixture was stirred at room temperature overnight.

Meanwhile, in a separate 250 mL schlenk flask, dichlorodimethylsilane (1.2 mL, mmol, Fw 129.06, d 1.07 g/mL) was dissolved in 30 mL of hexane, and the solution was cooled to −78° C. Then, the previously prepared lithiated solution was slowly injected into this solution. Thereafter, the resulting solution was stirred at room temperature for one day.

Meanwhile, after dissolving 10 mmol of TMCP in THF, the solution was cooled to 0° C. Then, n-BuLi (2.5 M in hexane, 4.8 mL, 12 mmol) was slowly added dropwise to the solution, and the resulting solution was stirred at room temperature for one day. Thereafter, the chloro(9H-fluoren-9-yl)dimethylsilane solution, which was stirred for one day, and the lithiated-TMCP solution were mixed with cannula. At this time, no matter which solution of the above two solutions was transferred with the cannula, the experimental results were not affected. The mixture of the two solutions was stirred for one day, and then 50 mL of water was added to the flask to terminate the reaction, followed by separating organic layers. Then, the organic layers were treated with $MgSO_4$ to remove moisture, and dried under reduced pressure to obtain (9H-fluoren-9-yl)(2,3,4,5-tetramethylcyclopenta-2,4-dien-1-yl)silane in the form of yellow powder (3.53 g, 10.25 mmol, 100% yield, NMR-based purity 100%, Mw 344.56 g/mol).

$^1$H NMR (500 MHz, $CDCl_3$): −0.36 (6H, s), 1.80 (6H, s), 1.94 (6H, s), 3.20 (1H, s), 4.09 (1H, s), 7.28-7.33 (4H, m), 7.52 (2H, d), 7.83 (2H, d).

In an oven-dried 250 mL schlenk flask, the previously prepared intermediate was added, dissolved in diethyl ether, and 2.1 equivalents of n-BuLi (8.6 mL, 21.5 mmol) was added dropwise, followed by stirring overnight. Thereafter, the resulting product was dried under vacuum and the resulting slurry was filtered through a schlenk filter to obtain a yellow solid. The yellow solid was placed in a new 250 mL schlenk flask, and 50 mL toluene was added to prepare a suspension.

Meanwhile, 1 equivalent of $ZrCl_4(THF)_2$ was added to a separately-prepared 250 mL schlenk flask in a glove box, and toluene was added for dispersion. Then, the Zr solution and the previously prepared lithiated ligand solution were cooled to −78° C. Thereafter, the previously prepared lithiated ligand solution was slowly injected into the mixture. Then, after slowly raising the temperature of the resulting mixture to room temperature, the mixture was stirred for one day.

It was attempted to remove LiCl from the reaction product thus obtained by filtration with a schlenk filter under argon. However, due to poor solubility of the product, dimethylsilylene(tetramethylcyclopentadienyl)(9H-fluoren-9-yl)zirconium dichloride was obtained in the form of filtercake (3.551 g, 6.024 mmol, 61.35% yield, NMR-based purity 85.6 wt % (remaining content is LiCl), Mw 504.68 g/mol).

$^1$H NMR (500 MHz, $CDCl_3$): 1.30 (6H, s), 1.86 (6H, s), 1.95 (6H, s), 7.21 (2H, m), 7.53 (2H, m), 7.65 (2H, m), 8.06 (2H, m).

Comparative Synthesis Example 5

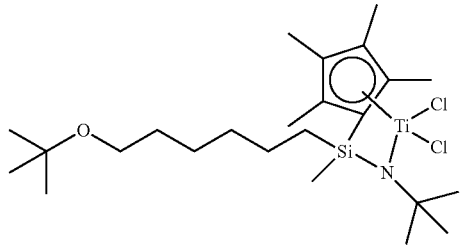

50 g of Mg (s) was added to a 10 L reactor at room temperature, followed by 300 mL of THF. 0.5 g of 12 was added, and the reactor temperature was maintained at 50° C. After the reactor temperature was stabilized, 250 g of 6-t-butoxyhexyl chloride was added to the reactor at a rate of 5 mL/min using a feeding pump. As the 6-t-butoxyhexyl chloride was added, it was observed that the temperature of the reactor was raised by about 4° C. to 5° C. While continuously adding 6-t-butoxyhexyl chloride, the mixture was stirred for 12 hours to obtain a black reaction solution. 2 mL of the black solution was taken to which water was added to obtain organic layers. The organic layers were confirmed to be 6-t-butoxyhexane through $^1$H-NMR. It was confirmed therefrom that the Grignard reaction was well performed. Consequently, 6-t-butoxyhexyl magnesium chloride was synthesized. 500 g of $MeSiCl_3$ and 1 L of THF were added to a reactor, and then the reactor temperature was cooled down to −20° C. 560 g of the previously synthesized 6-t-butoxyhexyl magnesium chloride was added to the reactor at a rate of 5 mL/min using a feeding pump. After completion of the feeding of Grignard reagent, the mixture was stirred for 12 hours while slowly raising the reactor temperature to room temperature, and it was confirmed that a white $MgCl_2$ salt was formed. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be the desired methyl(6-t-butoxy hexyl)dichlorosilane through 1H-NMR.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H). 1.2 mol (150 g) of tetramethylcyclopentadiene (150 g) and 2.4 L of THF were added to the reactor, and then the reactor temperature was cooled down to −20° C. 480 mL of n-BuLi was added to the reactor at a rate of 5 ml/min using a feeding pump. After n-BuLi was added, the mixture was stirred for 12 hours while slowly raising the reactor temperature to room temperature. Thereafter, an equivalent of methyl(6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH$_2$ was added. The mixture was stirred for 12 hours while slowly raising the reactor temperature to room temperature. Then, THF was removed and 4 L of hexane was added to obtain a filtered solution from which the salt was removed through a labdori. The filtered solution was added to the reactor again, and hexane was removed at 70° C. to obtain a yellow solution. This was confirmed to be methyl(6-t-butoxyhexyl)(tetramethylCpH)t-butylaminosilane through $^1$H-NMR.

10 mmol of TiCl$_3$(THF)$_3$ was rapidly added to a dilithium salt of a ligand at −78° C., which was synthesized from n-BuLi and the ligand of dimethyl(tetramethylCpH)t-butylaminosilane in THF solution. The reaction solution was stirred for 12 hours while slowly raising the temperature from −78° C. to room temperature. Then, an equivalent of PbCl$_2$ (10 mmol) was added at room temperature, and the mixture was stirred for 12 hours to obtain a dark black solution with blue color. After removing THF from the resulting reaction solution, hexane was added to filter the product. Hexane was removed from the filtered solution, and then the product was confirmed to be the desired tBu-O—(CH$_2$)$_6$](CH$_3$)Si(C$_5$(CH$_3$)$_4$)(tBu-N)TiCl$_2$ through $^1$H-NMR.

$^1$H-NMR (CDCl$_3$): 3.3 (s, 4H), 2.2 (s, 6H), 2.1 (s, 6H), 1.8-0.8 (m), 1.4 (s, 9H), 1.2 (s, 9H), 0.7 (s, 3H).

Comparative Synthesis Example 6

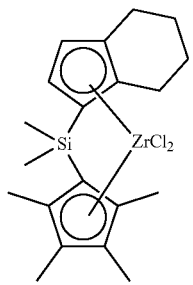

The transition metal compound (20 mmol) of Synthesis Example 3, 60 mL of dichloromethane (DCM), and 5 mol % of a Pd/C catalyst were added to a high-pressure stainless steel (sus) reactor under an argon atmosphere. The argon in the high-pressure reactor was replaced with hydrogen three times, and the hydrogen was charged to a pressure of 20 bar. The reaction was completed by stirring at 35° C. for 24 hours. After replacing the inside with argon, the DCM solution was transferred to a schlenk flask under an argon atmosphere. This solution was passed through celite under argon to remove the Pd/C catalyst, and the solvent was dried to obtain a solid catalyst precursor.

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

<Preparation of Supported Catalyst>

Example 1: Preparation of Hybrid Supported Metallocene Catalyst

First, silica (SP 952 manufactured by Grace Davison) was dehydrated and dried under vacuum at a temperature of 200° C. for 12 hours to prepare a support.

Then, 3.0 kg of a toluene solution was added to a 20 L high-pressure stainless steel (sus) reactor, 800 g of the previously prepared silica (Grace Davison, SP952) was added thereto, and the reactor temperature was raised to 40° C. while stirring. After the silica was sufficiently dispersed for 60 minutes, 6 kg of a 10 wt % methylaluminoxane (MAO)/toluene solution was added, and the mixture was slowly reacted while stirring at 70° C. at 200 rpm for 1 hour. After completion of the reaction, the reaction solution was decanted, and then washed several times with a sufficient amount of toluene until unreacted aluminum compounds were completely removed.

After raising the reactor temperature to 50° C., 0.2 mmol of the first metallocene compound prepared in Synthesis Example 1 dissolved in toluene was added in a solution state, and reacted for 2 hours while stirring at 40° C. at 200 rpm.

After completion of the reaction, 0.1 mmol of the second metallocene compound prepared in Synthesis Example 4 was dissolved in toluene, and reacted for 2 hours while stirring at 40° C. at 200 rpm.

When the reaction was completed, the stirring was stopped and the reaction solution was subjected to decantation after settling for 30 minutes. After washing with a sufficient amount of toluene, 50 mL of toluene was added again. Then, stirring was stopped for 10 minutes, and washing with a sufficient amount of toluene was performed to remove compounds not participating in the reaction. Thereafter, 3.0 kg of hexane was added to the reactor and stirred, and the hexane slurry was transferred to a filter for filtration.

A hybrid supported metallocene catalyst was obtained by primary drying at room temperature under reduced pressure for 5 hours, and secondary drying at 50° C. under reduced pressure for 4 hours.

Example 2: Preparation of Hybrid Supported Metallocene Catalyst

A hybrid supported metallocene catalyst was prepared in the same manner as in Example 1, except that 0.15 mmol of the metallocene compound prepared in Synthesis Example 2 was added instead of the metallocene compound prepared in Synthesis Example 1, and 0.15 mmol of the metallocene compound prepared in Synthesis Example 4 was added.

Example 3: Preparation of Hybrid Supported Metallocene Catalyst

A hybrid supported metallocene catalyst was prepared in the same manner as in Example 1, except that 0.15 mmol of the metallocene compound prepared in Synthesis Example 3 was added instead of the metallocene compound prepared in Synthesis Example 1, and 0.15 mmol of the metallocene compound prepared in Synthesis Example 4 was added.

Example 4: Preparation of Hybrid Supported Metallocene Catalyst

A hybrid supported metallocene catalyst was prepared in the same manner as in Example 1, except that 0.2 mmol of the metallocene compound prepared in Synthesis Example 1 was added, and 0.1 mmol of the metallocene compound prepared in Synthesis Example 5 was added instead of the metallocene compound prepared in Synthesis Example 4.

Example 5: Preparation of Hybrid Supported Metallocene Catalyst

A hybrid supported metallocene catalyst was prepared in the same manner as in Example 1, except that 0.15 mmol of the metallocene compound prepared in Synthesis Example 2 was added instead of the metallocene compound prepared in Synthesis Example 1, and 0.15 mmol of the metallocene compound prepared in Synthesis Example was added instead of the metallocene compound prepared in Synthesis Example 4.

Comparative Example 1: Preparation of Hybrid Supported Metallocene Catalyst 100 mL of toluene was added to a 300 mL glass reactor, and 10 g of silica (SP2410 manufactured by Grace Davison) was added, followed by stirring while raising the reactor temperature to 40° C. 30 mL of a 30 wt % methylaluminoxane (MAO)/toluene solution (manufactured by Albemarle) was added thereto, and the temperature was raised to 70° C., followed by stirring at 200 rpm for 12 hours.

Meanwhile, 0.30 g (0.15 mmol) of the metallocene compound prepared in Comparative Synthesis Example 1, 0.26 g (0.225 mmol) of the metallocene compound prepared in Comparative Synthesis Example 4, 30 mL of toluene, and 0.5 g of triisobutyl aluminum were added to a schlenk flask, and stirred at room temperature for 15 minutes. Then, the resulting mixture was put into the glass reactor, and the temperature of the glass reactor was raised to 70° C., followed by stirring for 2 hours.

Thereafter, the reactor temperature was lowered to room temperature, and stirring was stopped. Then, the reaction product was allowed to stand for 10 minutes, followed by decantation. Thereafter, 100 mL of hexane was added to the reactor to obtain a slurry, and then the slurry was transferred to a schlenk flask for decantation. The obtained reaction product was dried under reduced pressure at room temperature for 3 hours to obtain a supported catalyst.

Comparative Example 2: Preparation of Single Supported Metallocene Catalyst

First, silica (SP 952 manufactured by Grace Davison) was dehydrated and dried under vacuum at a temperature of 200° C. for 12 hours to prepare a support.

Then, 3.0 kg of a toluene solution was added to a 20 L high-pressure stainless steel (sus) reactor, 800 g of the previously prepared silica (Grace Davison, SP952) was added thereto, and the reactor temperature was raised to 40° C. while stirring. After the silica was sufficiently dispersed for 60 minutes, 6 kg of a 10 wt % methylaluminoxane (MAO)/toluene solution was added, and the mixture was slowly reacted while stirring at 70° C. at 200 rpm for 1 hour. After completion of the reaction, the reaction solution was decanted, and then washed several times with a sufficient amount of toluene until unreacted aluminum compounds were completely removed.

After raising the reactor temperature to 50° C., 0.3 mmol of the first metallocene compound prepared in Synthesis Example 1 dissolved in toluene was added in a solution state, and reacted for 2 hours while stirring at 40° C. at 200 rpm.

When the reaction was completed, the stirring was stopped and the reaction solution was subjected to decantation after settling for 30 minutes. After washing with a sufficient amount of toluene, 50 mL of toluene was added again. Then, stirring was stopped for 10 minutes, and washing with a sufficient amount of toluene was performed to remove compounds not participating in the reaction. Thereafter, 3.0 kg of hexane was added to the reactor and stirred, and the hexane slurry was transferred to a filter for filtration.

A hybrid supported metallocene catalyst was obtained by primary drying at room temperature under reduced pressure for 5 hours, and secondary drying at 50° C. under reduced pressure for 4 hours.

Comparative Example 3: Preparation of Hybrid Supported Metallocene Catalyst

A hybrid supported metallocene catalyst was prepared in the same manner as in Example 1, except that 0.15 mmol of the metallocene compound prepared in Comparative Synthesis Example 2 was added instead of the metallocene compound prepared in Synthesis Example 1, and 0.15 mmol of the metallocene compound prepared in Synthesis Example 4 was added.

Comparative Example 4: Preparation of Hybrid Supported Metallocene Catalyst

A hybrid supported metallocene catalyst was prepared in the same manner as in Example 1, except that 0.15 mmol of the metallocene compound prepared in Synthesis Example 1 was added, and 0.15 mmol of the metallocene compound prepared in Comparative Synthesis Example 5 was added instead of the metallocene compound prepared in Synthesis Example 4.

Comparative Example 5: Preparation of Hybrid Supported Metallocene Catalyst

A hybrid supported metallocene catalyst was prepared in the same manner as in Example 1, except that the metallocene compound prepared in Comparative Synthesis Example 3 was used as the first precursor instead of the metallocene compound prepared in Synthesis Example 1.

Comparative Example 6: Preparation of Hybrid Supported Metallocene Catalyst

A hybrid supported metallocene catalyst was prepared in the same manner as in Example 3, except that the metallocene compound prepared in Comparative Synthesis Example 6 was used as the second precursor instead of the metallocene compound prepared in Synthesis Example 4.

Then, 3.0 kg of a toluene solution was added to a 20 L high-pressure stainless steel (sus) reactor, 800 g of the previously prepared silica (Grace Davison, SP952) was added thereto, and the reactor temperature was raised to 40° C. while stirring. After the silica was sufficiently dispersed for 60 minutes, 6 kg of a 10 wt % methylaluminoxane (MAO)/toluene solution was added, and the mixture was slowly reacted while stirring at 70° C. at 200 rpm for 1 hour. After completion of the reaction, the reaction solution was decanted, and then washed several times with a sufficient amount of toluene until unreacted aluminum compounds were completely removed.

After raising the reactor temperature to 50° C., 0.3 mmol of the second metallocene compound prepared in Synthesis Example 4 dissolved in toluene was added in a solution state, and reacted for 2 hours while stirring at 40° C. at 200 rpm.

When the reaction was completed, the stirring was stopped and the reaction solution was subjected to decantation after settling for 30 minutes. After washing with a sufficient amount of toluene, 50 mL of toluene was added again. Then, stirring was stopped for 10 minutes, and washing with a sufficient amount of toluene was performed to remove compounds not participating in the reaction. Thereafter, 3.0 kg of hexane was added to the reactor and stirred, and the hexane slurry was transferred to a filter for filtration.

A hybrid supported metallocene catalyst was obtained by primary drying at room temperature under reduced pressure for 5 hours, and secondary drying at 50° C. under reduced pressure for 4 hours.

TEST EXAMPLES

Test Example 1: Preparation of Polyethylene

Ethylene-1-hexene was slurry-polymerized in the presence of the supported catalyst prepared in one of Examples and Comparative Examples under the conditions shown in Table 1 below.

At this time, a continuous polymerization reactor for an iso-butane (i-C4) slurry loop process was used, a reactor volume was 140 L, and a reaction flow rate was about 7 m/s. Gases (ethylene, hydrogen) required for polymerization and 1-hexene as a comonomer were constantly and continuously added, and the flow rates were adjusted according to the target product. The concentrations of all gases and comonomer (1-hexene) were confirmed by on-line gas chromatograph. The supported catalyst was introduced into the isobutane slurry, the reactor pressure was maintained at about 40 bar, and the polymerization temperature was about 85° C.

TABLE 1

|  | First precursor | Second precursor | Molar ratio of catalyst precursors |
|---|---|---|---|
| Example 1 | Synthesis Example 1 | Synthesis Example 4 | 2:1 |
| Example 2 | Synthesis Example 2 | Synthesis Example 4 | 1:1 |
| Example 3 | Synthesis Example 3 | Synthesis Example 4 | 1:1 |
| Example 4 | Synthesis Example 1 | Synthesis Example 5 | 2:1 |
| Example 5 | Synthesis Example 2 | Synthesis Example 5 | 1:1 |
| Comparative Example 1 | Comparative Synthesis Example 1 | Comparative Synthesis Example 4 | 1:1.5 |
| Comparative Example 2 | Synthesis Example 1 | None | Single-supported |
| Comparative Example 3 | Comparative Synthesis Example 2 | Synthesis Example 4 | 1:1 |
| Comparative Example 4 | Synthesis Example 1 | Comparative Synthesis Example 5 | 1:1 |
| Comparative Example 5 | Comparative Synthesis Example 3 | Synthesis Example 4 | 2:1 |
| Comparative Example 6 | Synthesis Example 3 | Comparative Synthesis Example 6 | 1:1 |

In Table 1 above, the molar ratio of catalyst precursors refers to a molar ratio of the first metallocene compound:the second metallocene compound.

Test Example 2: Evaluation of Activity of Hybrid Supported Catalyst, Process Stability and Physical Properties of Polyethylene The activity, process stability, and physical properties of the polyethylene copolymer of Examples and Comparative Examples were measured by the following method, and the results are shown in Table 2 below.

1) Activity (kg PE/g·cat·hr)

It was calculated as a ratio of the weight (kg PE) of the polyethylene copolymer prepared to the weight of the supported catalyst used (g·Cat) per unit time (h).

2) Weight Average Molecular Weight (Mw, g/Mol) and Molecular Weight Distribution (Mw/Mn, PDI)

The molecular weight distribution (Mw/Mn, polydispersity index) of ethylene-1 hexene copolymers prepared in Examples and Comparative Examples can be calculated by dividing the weight average molecular weight (Mw) by the number average molecular weight (Mn) after measuring the weight average molecular weight (Mw) and the number average molecular weight (Mn) using gel permeation chromatography (GPC, manufactured by Water).

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each ethylene-1 hexene copolymer sample was pretreated by dissolving in 1,2,4-trichlorobenzene containing 0.0125% of BHT at 160° C. for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

3) Melt Index (MI2.16, g/10 min)

The melt index (M12.16) was measured according to ASTM D1238 at 190° C. under a load of 2.16 kg, and expressed as the weight (g) of the polymer melted for 10 minutes.

4) Melt Flow Rate Ratio (MFRR$_{21.6/2.16}$)

The melt flow rate ratio (MFRR, 21.6/2.16) was calculated by dividing MFR$^{21.6}$ by MFR$_{2.16}$, wherein MFR$_{21.6}$ was measured according to ISO 1133 at a temperature of 190° C. and a load of 21.6 kg, and MFR$_{2.16}$ was measured according to ISO 1133 at a temperature of 190° C. and a load of 2.16 kg.

5) The Number of Long Chain Branches (LCB)

The number of LCB per 1,000 carbons (the number of branches having 8 or more carbon atoms per 1,000 carbon atoms, unit: branch/1,000 C) of ethylene-1-hexene copolymers of Examples and Comparative Examples was measured using a rotational rheometer and GPC.

Specifically, rheological properties and molecular weight distribution of the polymer sample were measured using a rotational rheometer and GPC. Then, the weight ratio (Wt) of each polymer in the olefin polymer, weight average molecular weight (Mw), and the number of side chains were selected as structural parameters of the sample, and arbitrary values of the selected structural parameters were set.

Thereafter, the rheological properties and molecular weight distribution were predicted from the above arbitrary values. An arbitrary value in which a margin of error between the predicted value and the actual value is less than 5% was derived as a definite value, and then the process of deriving the definite value by comparing the predicted value with the actual value of rheological properties was repeated from the process of setting an arbitrary value, thereby deriving 70 definite values.

6) The Number of Short Chain Branches (SCB) and BOCD Index

The weight average molecular weight (Mw), number average molecular weight (Mn), molecular weight distribution (Mw/Mn), and the number of SCB per 1,000 carbons of ethylene-1-hexene copolymers of Examples and Comparative Examples were measured using a GPC-FTIR instrument.

Specifically, the BOCD index was calculated based on the following Equation 1 through a molecular weight distribution curve obtained by plotting a log value (log M) of a weight average molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area.

$$BOCD\ Index = \frac{\left(\begin{array}{l}SCB\ \text{content at high molecular weight side} - \\ SCB\ \text{content at low molecular weight side}\end{array}\right)}{(SCB\ \text{content at low molecular weight side})}$$ [Equation 1]

If the BOCD index is 0 or less, it can be considered that the polymer has no BOCD structure, and if the BOCD index is more than 0, it can be considered that the polymer has the BOCD structure. It can be evaluated that as a polymer has the higher value, it has more excellent BOCD characteristics. Based on this, "o" is indicated for polymers having a BOCD structure, and "X" is indicated for polymers not having a BOCD structure.

As shown in Table 2, it can be seen that Examples of the present disclosure improved strength properties by optimizing the SCB content and distribution to introduce a BOCD structure, while improving shrinkage and processability by introducing long chan branch (LCB) into the polyethylene copolymer.

Test Example 3: Evaluation of Film Properties Using Polyethylene

The physical properties of the film using the polyethylene copolymer obtained in one of Examples and Comparative Examples were measured by the following method, and the results are shown in Table 3 below.

1) Shrinkage (MD Direction and TD Direction, %)

According to the American Society for Testing and Materials standard ASTM D 2732, a film having a thickness of 60 μm was prepared using the ethylene-1-hexene copolymer prepared in one of Examples and Comparative Examples, and the shrinkage was measured in the mold direction (MD) and in the transverse direction (TD), respectively.

2) Drop Impact Resistance (g)

According to the American Society for Testing and Materials standard ASTM D1709 A related to impact resistance, a film having a thickness of 60 μm was prepared using the ethylene-1-hexene copolymer prepared in one of Examples and Comparative Examples, and the drop impact resistance was calculated by measuring it 20 or more times per film sample and obtaining an average value thereof.

3) Processing Load (Bar)

Regarding extrusion processability, the processing load (bar) of the ethylene-1-hexene copolymers prepared in Examples and Comparative Examples was measured using a Haake extruder with cylinder-1/-2/-3/die=180/185/185/190 at 40 rpm.

TABLE 2

|  | Activity (kg PE/g · cat · hr) | $MI_{2.16}$ (g/10 min) | MFRR | Density | Mw ($\times 10^3$ g/mol) | Mw/Mn | LCB (/1000 C.) | SCB (/1000 C.) | BOCD Index | BOCD structure |
|---|---|---|---|---|---|---|---|---|---|---|
| Ex. 1 | 5.9 | 0.29 | 73.0 | 0.929 | 106 | 3.0 | 0.033 | 10.1 | 0.73 | o |
| Ex. 2 | 5.3 | 0.30 | 68.5 | 0.928 | 109 | 3.1 | 0.029 | 9.8 | 0.68 | o |
| Ex. 3 | 5.5 | 0.28 | 70.1 | 0.928 | 101 | 3.0 | 0.031 | 9.8 | 0.75 | o |
| Ex. 4 | 5.8 | 0.27 | 75.2 | 0.929 | 98 | 2.9 | 0.033 | 9.1 | 0.60 | o |
| Ex. 5 | 5.5 | 0.30 | 67.0 | 0.928 | 97 | 2.8 | 0.028 | 9.2 | 0.58 | o |
| Comp. Ex. 1 | 3.1 | 0.27 | 55.0 | 0.93 | 110 | 3.0 | 0.019 | 8.5 | −0.13 | X |
| Comp. Ex. 2 | 4.2 | 0.30 | 78.1 | 0.928 | 99 | 2.8 | 0.035 | 8.7 | −0.10 | X |
| Comp. Ex. 3 | 4 | 0.29 | 58.9 | 0.929 | 105 | 3.0 | 0.02 | 9 | 0.49 | o |
| Comp. Ex. 4 | 2.5 | 0.30 | 65.9 | 0.929 | 106 | 3.5 | 0.026 | 8.7 | 0.38 | o |
| Comp. Ex. 5 | 6.2 | 0.30 | 51.7 | 0.931 | 95 | 2.7 | 0.019 | 9.5 | 0.52 | o |
| Comp. Ex. 6 | 3.5 | 67.1 | 67.1 | 0.930 | 110 | 3.3 | 0.029 | 8.9 | 0.07 | X |

TABLE 3

| | Shrinkage (%, MD) | Shrinkage (%, TD) | Drop impact resistance (g) | Processing load (bar) |
|---|---|---|---|---|
| Example 1 | 60.1 | 22.5 | 650 | 210 |
| Example 2 | 61.2 | 21.3 | 630 | 220 |
| Example 3 | 62.7 | 22.1 | 670 | 230 |
| Example 4 | 61.6 | 22.6 | 590 | 210 |
| Example 5 | 60.7 | 19.9 | 590 | 250 |
| Comparative Example 1 | 59.2 | 13.1 | 300 | 340 |
| Comparative Example 2 | 62.0 | 22.1 | 290 | 200 |
| Comparative Example 3 | 60.0 | 16.1 | 510 | 320 |
| Comparative Example 4 | 59.9 | 19.3 | 420 | 290 |
| Comparative Example 5 | 58.1 | 11.2 | 550 | 320 |
| Comparative Example 6 | 62.0 | 19.2 | 350 | 250 |

As shown in Table 3, it can be seen that Examples of the present disclosure could provide a film having excellent shrinkage and processability as well as excellent strength properties. In particular, Examples 1 to 5 could provide a shrink film having high mechanical properties with drop impact resistance of 590 g or more without mixing with separate LLDPE or HDPE, and at the same time, it was confirmed that the shrinkage was maintained as high as 60.1% to 62.7% in the MD direction, and 19.9% to 22.5% in the TD direction, respectively, and the processing load was also excellent as 250 bar or less.

The invention claimed is:

1. A hybrid supported metallocene catalyst, comprising at least one first metallocene compound selected from compounds represented by the following Chemical Formula 1; at least one second metallocene compound selected from compounds represented by the following Chemical Formula 2; and a support on which the first and the second metallocene compounds are supported:

[Chemical Formula 1]

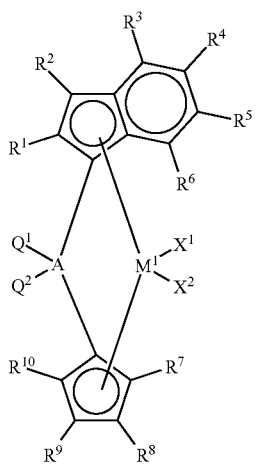

in Chemical Formula 1, $M^1$ is a Group 4 transition metal;

A is carbon (C), silicon (Si), or germanium (Ge);

$X^1$ and $X^2$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl (oxy) silyl group, a C1 to C30 sulfonate group, or a C1 to C30 sulfone group;

$R^1$ and $R^3$ to $R^{10}$ are the same as or different from each other, and are each independently hydrogen, a C1 to C30 hydrocarbyl group, a C1 to C30 hydrocarbyloxy group, or a C2 to C30 hydrocarbyloxyhydrocarbyl group;

$R^2$ is hydrogen, a C1 to C30 hydrocarbyl group, a C1 to C30 hydrocarbyloxy group, a C2 to C30 hydrocarbyloxyhydrocarbyl group, a C1 to C20 hydrocarbyl (oxy) silyl group, or a Cl to C20 silylhydrocarbyl group; and $Q^1$ and $Q^2$ are the same as or different from each other, and are each independently a C1 to C30 hydrocarbyl group, or a C1 to C30 hydrocarbyloxy group;

[Chemical Formula 2]

in Chemical Formula 2, $M^2$ is a Group 4 transition metal;

$X^3$ and $X^4$ are the same as or different from each other, and are each independently halogen, a nitro group, an amido group, a phosphine group, a phosphide group, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl (oxy) silyl group, a Cl to C30 sulfonate group, or a C1 to C30 sulfone group;

Z is —O—, —S—, —NR$_a$—, or —PR$_a$—;

$R_a$ is hydrogen, a C1 to C20 hydrocarbyl group, a C1 to C20 hydrocarbyl (oxy) silyl group, or a C1 to C20 silylhydrocarbyl group;

T is

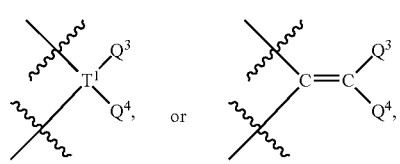

$T^1$ is C, Si, Ge, Sn, or Pb;

$Q^3$ is hydrogen, a C1 to C30 hydrocarbyl group, a C1 to C30 hydrocarbyloxy group, a C2 to C30 hydrocarbyloxyhydrocarbyl group, —SiH$_3$, a C1 to C30 hydrocarbyl (oxy) silyl group, a C1 to C30 hydrocarbyl group substituted with halogen, or —NR$_b$R$_c$;

$Q^4$ is a C2 to C30 hydrocarbyloxyhydrocarbyl group;

$R_b$ and $R_c$ are each independently hydrogen, or a C1 to C30 hydrocarbyl group, or $R_b$ and $R_c$ are connected with each other, and together with N to which they are attached to form an aliphatic or aromatic ring; and $C^1$ is any one of ligands represented by the following Chemical Formulae 2a to 2d,

[Chemical Formula 2a]

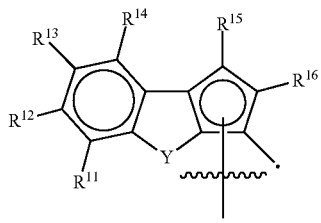

[Chemical Formula 2b]

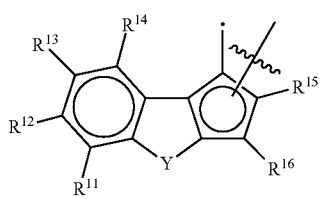

[Chemical Formula 2c]

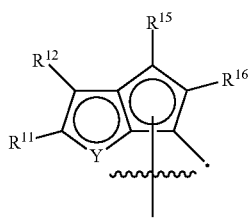

[Chemical Formula 2d]

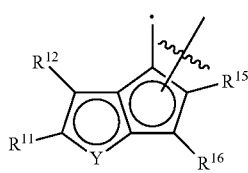

in Chemical Formulae 2a to 2d,
Y is O, or S,
$R^{11}$ to $R^{16}$ are the same as or different from each other, and are each independently hydrogen, a C1 to C30 hydrocarbyl group, or a C1 to C30 hydrocarbyloxy group;
—— represents a site of binding to T, and
⊹ represents a site of binding to $M^2$.

2. The hybrid supported metallocene catalyst of claim 1, wherein the first metallocene compound is represented by the following Chemical Formula 1-1:

[Chemical Formula 1-1]

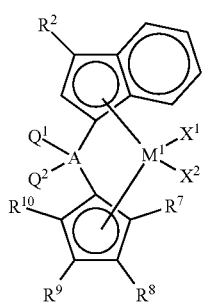

in Chemical Formula 1-1, $M^1$, $X^1$, $X^2$, $R^2$, $R^7$ to $R^{10}$, A, $Q^1$, and $Q^2$ are the same as defined in claim 1.

3. The hybrid supported metallocene catalyst of claim 1, wherein $M^1$ is titanium (Ti), zirconium (Zr) or hafnium (Hf),
A is silicon (Si), and
each of $X^1$ and $X^2$ is independently halogen.

4. The hybrid supported metallocene catalyst of claim 1, wherein each of $R^1$ and $R^3$ to $R^6$ is hydrogen, and
$R^2$ is hydrogen, a C1 to C10 alkyl group, a C1 to C10 alkoxy group, a C2 to C10 alkenyl group, a C6 to C12 aryl group, a C7 to C14 arylalkyl group, a C7 to C14 alkylaryl group, a C1 to 10 alkylsilyl group, a C1 to C10 silylalkyl group, or a C2 to C12 alkylsilylalkylene group.

5. The hybrid supported metallocene catalyst of claim 1, wherein each of $R^1$ and $R^3$ to $R^6$ is hydrogen, and
$R^2$ is hydrogen, methyl, ethyl, propyl, butyl, butenyl, trimethylsilylmethyl, or phenyl.

6. The hybrid supported metallocene catalyst of claim 1, wherein each of $R^7$ to $R^{10}$ is independently a C1 to C20 alkyl group.

7. The hybrid supported metallocene catalyst of claim 1, wherein each of $Q^1$ and $Q^2$ is independently a C1 to C20 alkyl group, or a C6 to C12 aryl group.

8. The hybrid supported metallocene catalyst of claim 1, wherein the first metallocene compound is represented by one of the following structural formulae:

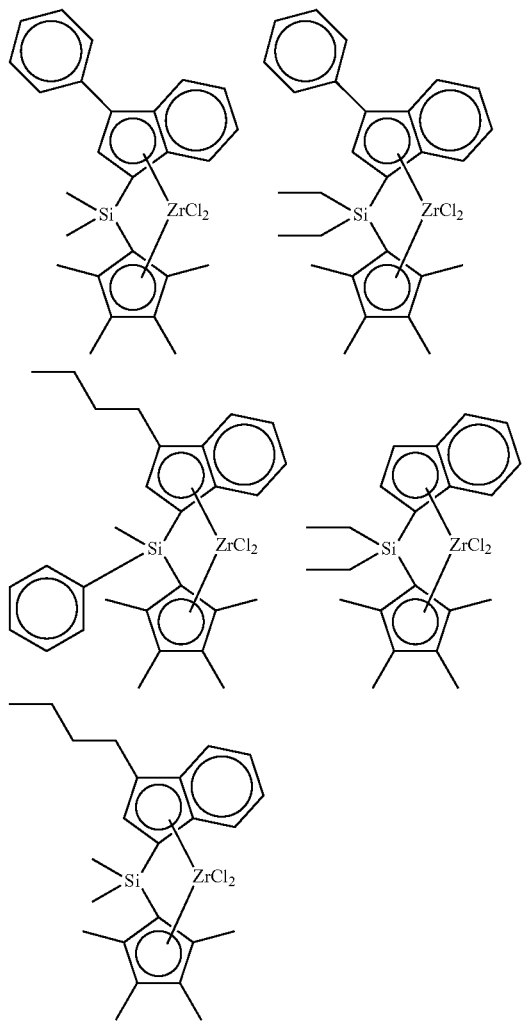

-continued

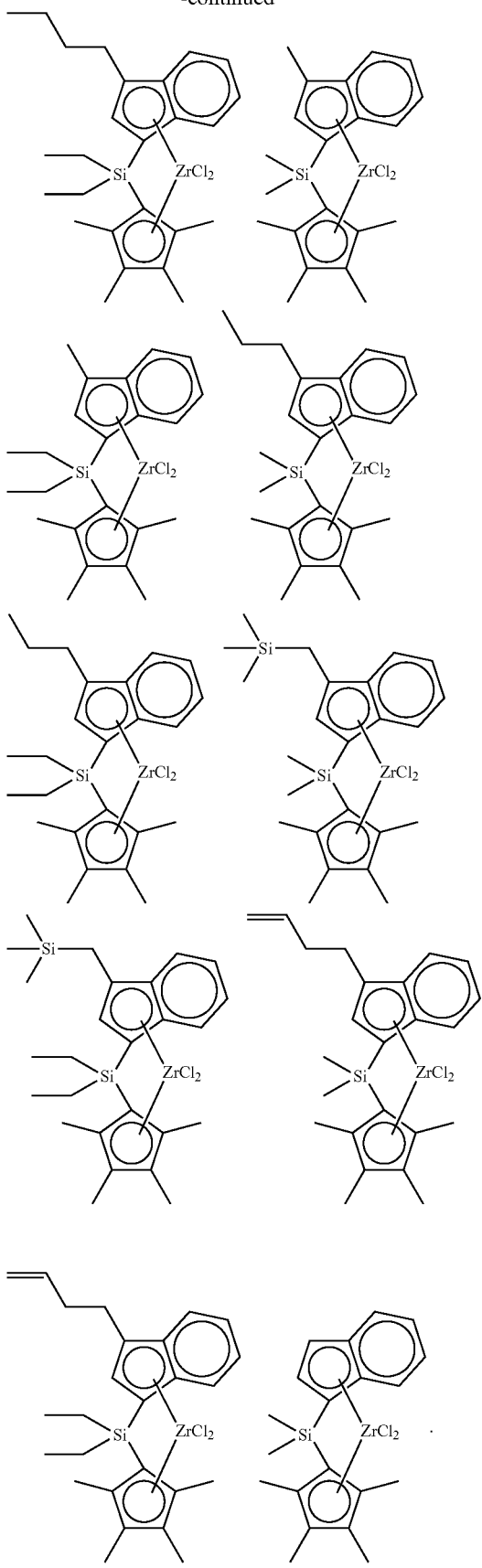

9. The hybrid supported metallocene catalyst of claim 1, wherein Z is —NR$_a$—, and R$_a$ is a C1 to C10 hydrocarbyl group.

10. The hybrid supported metallocene catalyst of claim 1, where T is

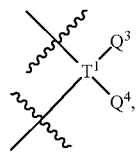

T$^1$ is carbon (C), or silicon (Si),

Q$^3$ is a C1 to C30 hydrocarbyl group, or a C1 to C30 hydrocarbyloxy group, and Q$^4$ is a C2 to C30 hydrocarbyloxyhydrocarbyl group.

11. The hybrid supported metallocene catalyst of claim 1, wherein the second metallocene compound is represented by one of the following Chemical Formulae 2-1 to 2-4:

[Chemical Formula 2-1]

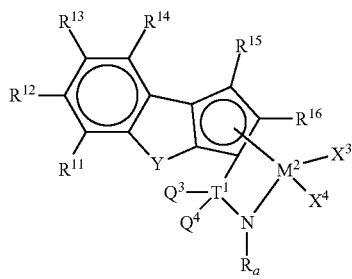

[Chemical Formula 2-2]

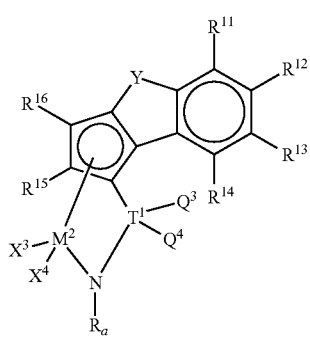

[Chemical Formula 2-3]

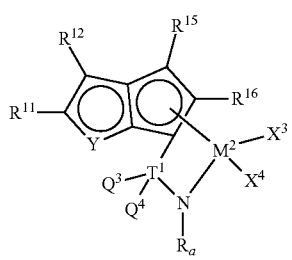

-continued

[Chemical Formula 2-4]

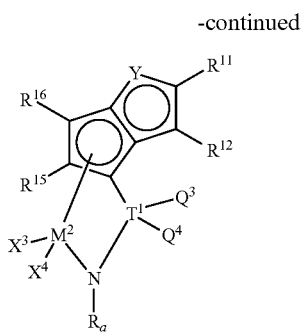

in Chemical Formulae 2-1 to 2-4, $M^2$, $X^3$, $X^4$, $R_a$, $T^1$, $Q^3$, $Q^4$, and $R^{11}$ to $R^{16}$ are the same as defined in claim 1.

12. The hybrid supported metallocene catalyst of claim 1, wherein each of $R^{11}$ to $R^{14}$ is independently hydrogen or a C1 to C10 hydrocarbyl group; and
each of $R^{15}$ and $R^{16}$ is independently a C1 to C10 hydrocarbyl group.

13. The hybrid supported metallocene catalyst of claim 1, wherein $M^2$ is titanium, zirconium, or hafnium, and
each of $X^3$ and $X^4$ is independently halogen, or a C1 to C10 alkyl group.

14. The hybrid supported metallocene catalyst of claim 1, wherein the second metallocene compound is represented by one of the following structural formulae:

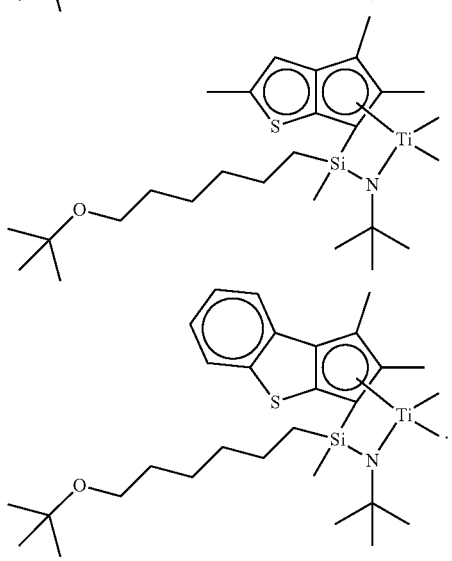

15. The hybrid supported metallocene catalyst of claim 1, wherein the first metallocene compound and the second metallocene compound are supported in a molar ratio of 1:2 to 5:1.

16. The hybrid supported metallocene catalyst of claim 1, wherein the first metallocene compound is represented by the following Chemical Formula 1-1, and the second metallocene compound is represented by one of the following Chemical Formulae 2-1 to 2-4:

[Chemical Formula 1-1]

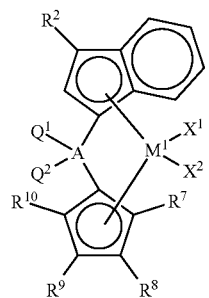

in Chemical Formula 1-1, $M^1$, $X^1$, $X^2$, $R^2$, $R^7$ to $R^{10}$, $Q^1$, and $Q^2$ are the same as defined in claim 1,

[Chemical Formula 2-1]

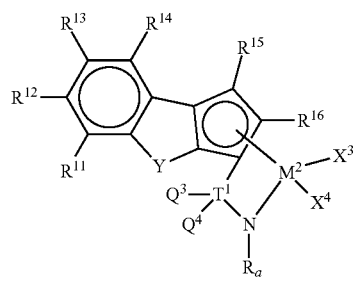

[Chemical Formula 2-2]

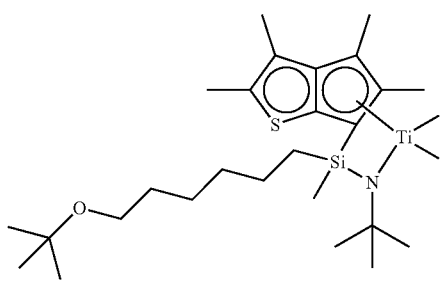

[Chemical Formula 2-3]

[Chemical Formula 2-4]

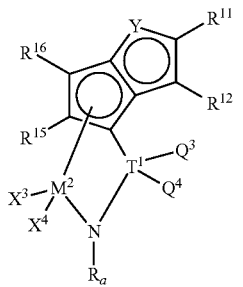

in Chemical Formulae 2-1 to 2-4, $M^2$, $X^3$, $X^4$, $R_a$, $T^1$, $Q^3$, $Q^4$, and $R^{11}$ to $R^{16}$ are the same as defined in claim 1.

17. A process for preparing a polyethylene copolymer, comprising the step of copolymerizing ethylene and alpha-olefin in the presence of the hybrid supported metallocene catalyst of claim 1.

18. The process for preparing a polyethylene copolymer of claim 17,
wherein the alpha-olefin is at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene.

* * * * *